United States Patent
Edge et al.

(10) Patent No.: US 11,785,620 B2
(45) Date of Patent: Oct. 10, 2023

(54) SYSTEMS AND METHODS FOR SUPER LOW LATENCY LOCATION SERVICE FOR WIRELESS NETWORKS

(71) Applicant: QUALCOMM Incorporated, San Diego, CA (US)

(72) Inventors: Stephen William Edge, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/141,069

(22) Filed: Jan. 4, 2021

(65) Prior Publication Data

US 2021/0127386 A1 Apr. 29, 2021

Related U.S. Application Data

(63) Continuation of application No. 16/711,358, filed on Dec. 11, 2019, now Pat. No. 10,966,209.

(Continued)

(51) Int. Cl.
*H04W 72/51* (2023.01)
*H04W 4/029* (2018.01)
(Continued)

(52) U.S. Cl.
CPC ........... *H04W 72/51* (2023.01); *H04W 4/029* (2018.02); *H04W 4/20* (2013.01); *H04W 12/037* (2021.01);
(Continued)

(58) Field of Classification Search
CPC . H04W 72/048; H04W 72/085; H04W 4/029; H04W 4/20; H04W 12/037; H04W 12/0431; H04W 72/51; H04W 72/542
(Continued)

(56) References Cited

U.S. PATENT DOCUMENTS

| | | | |
|---|---|---|---|
| 8,000,702 B2* | 8/2011 | Dawson | H04W 80/085 455/433 |
| 8,867,556 B2* | 10/2014 | Kim | H04W 40/20 370/401 |

(Continued)

FOREIGN PATENT DOCUMENTS

| | | | | |
|---|---|---|---|---|
| WO | WO-2007002303 | | 1/2007 | |
| WO | WO-2016154009 A1 * | | 9/2016 | G06Q 30/0207 |

(Continued)

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP Standard, Technical Specification, 3GPP TS 36.305, 3rd Generation Partnership Project (3GPP), Mobile Competence Centre, 650, Route Des Lucioles, F-06921, Sophia-Antipolis Cedex, France, vol. RAN WG2, No. V15.1.0, Sep. 27, 2018 (Sep. 27, 2018), pp. 1-87, XP051487411, [retrieved on Sep. 27, 2018] paragraphs [0001], [04.1], [06.2], [07 .1], [OB. 2]- [OB.4].

(Continued)

*Primary Examiner* — Mong-Thuy T Tran
(74) *Attorney, Agent, or Firm* — QUALCOMM Incorporated

(57) ABSTRACT

An external client requests the location of a UE using control plane signaling. The UE sends downlink location measurements, such as Reference Signal Time Differences, for a plurality of base stations (BSs) to a serving BS at a layer 1 or layer 2 protocol level and at first periodic intervals. The UE and the plurality of BSs send additional location measurements, such as receive time-transmission time differences, to the serving BS at second periodic intervals, which are longer than the first periodic intervals. The serving BS uses the additional location measurements and downlink (Continued)

location measurements to determine timing information, such as Real Time Differences, for the plurality of BSs. The serving BS determines the location of the UE using the downlink location measurements and the timing information at the first periodic intervals and sends the location to the external client using user plane signaling to reduce delay.

50 Claims, 11 Drawing Sheets

Related U.S. Application Data

(60) Provisional application No. 62/945,664, filed on Dec. 9, 2019, provisional application No. 62/805,029, filed on Feb. 13, 2019, provisional application No. 62/783,123, filed on Dec. 20, 2018, provisional application No. 62/778,852, filed on Dec. 12, 2018.

(51) Int. Cl.
*H04W 4/20* (2018.01)
*H04W 12/037* (2021.01)
*H04W 12/0431* (2021.01)
*H04W 72/542* (2023.01)

(52) U.S. Cl.
CPC ..... *H04W 12/0431* (2021.01); *H04W 72/542* (2023.01)

(58) Field of Classification Search
USPC .......................................................... 455/450
See application file for complete search history.

(56) References Cited

U.S. PATENT DOCUMENTS

| | | | |
|---|---|---|---|
| 9,026,093 B2 | 5/2015 | Niemenmaa et al. | |
| 9,154,907 B2 | 10/2015 | Edge et al. | |
| 9,838,838 B2 * | 12/2017 | Rhee | G01S 5/0072 |
| 10,057,877 B2 * | 8/2018 | Lee | H04W 4/029 |
| 10,080,098 B1 | 9/2018 | Edge | |
| 10,285,126 B2 * | 5/2019 | Choi | H04W 52/0229 |
| 10,383,081 B2 | 8/2019 | Edge et al. | |
| 10,462,610 B1 * | 10/2019 | Irish | G01S 19/49 |
| 10,547,421 B2 | 1/2020 | Palanivelu et al. | |
| 2005/0136942 A1 | 6/2005 | Timiri et al. | |
| 2012/0134348 A1 * | 5/2012 | Kim | G01S 5/02529 370/338 |
| 2012/0295623 A1 | 11/2012 | Siomina et al. | |
| 2013/0059610 A1 | 3/2013 | Siomina et al. | |
| 2013/0311764 A1 * | 11/2013 | Alpert | H04W 12/033 713/150 |
| 2014/0094188 A1 * | 4/2014 | Kazmi | H04W 4/023 455/456.1 |
| 2016/0302228 A1 | 10/2016 | Kazmi et al. | |
| 2016/0309379 A1 * | 10/2016 | Pelletier | H04W 24/08 |
| 2017/0276761 A1 | 9/2017 | Park et al. | |
| 2017/0332192 A1 | 11/2017 | Edge | |
| 2018/0091196 A1 | 3/2018 | Frenne et al. | |
| 2018/0139763 A1 | 5/2018 | Bitra et al. | |
| 2018/0262868 A1 | 9/2018 | Edge | |
| 2018/0279182 A1 * | 9/2018 | Sang | H04W 74/0833 |
| 2019/0028170 A1 | 1/2019 | Zhang et al. | |
| 2019/0222286 A1 | 7/2019 | Miao | |
| 2019/0281588 A1 | 9/2019 | Zhang et al. | |
| 2020/0196101 A1 | 6/2020 | Edge | |
| 2020/0196298 A1 | 6/2020 | Edge et al. | |
| 2021/0320769 A1 * | 10/2021 | Cha | G01S 5/06 |

FOREIGN PATENT DOCUMENTS

| | | |
|---|---|---|
| WO | WO-201 7134295 A1 | 8/2017 |
| WO | WO-2017203487 A1 | 11/2017 |
| WO | WO-2018064537 | 4/2018 |
| WO | WO-2018069311 A1 | 4/2018 |
| WO | WO-2018159967 A1 | 9/2018 |

OTHER PUBLICATIONS

International Search Report and Written Opinion—PCT/US2019/065991—ISA/EPO—dated Mar. 3, 2020.
International Search Report and Written Opinion—PCT/US2019/065996—ISA/EPO—dated Mar. 9, 2020.
Taiwan Search Report—TW108145611—TIPO—dated Jan. 2, 2023.

* cited by examiner

SYSTEMS AND METHODS FOR SUPER LOW LATENCY LOCATION SERVICE FOR WIRELESS NETWORKS

CROSS-REFERENCE TO RELATED APPLICATIONS

This application is a continuation of U.S. Ser. No. 16/711,358, entitled "SYSTEMS AND METHODS FOR SUPER LOW LATENCY LOCATION SERVICE FOR WIRELESS NETWORKS," filed Dec. 11, 2019, and claims the benefit of U.S. Provisional Application Nos. 62/778,852, entitled "SYSTEMS AND METHODS FOR LOCATION REPORTING WITH LOW LATENCY FOR FIFTH GENERATION WIRELESS NETWORKS," filed Dec. 12, 2018, 62/783,123, entitled "SYSTEMS AND METHODS FOR LOCATION REPORTING WITH LOW LATENCY FOR FIFTH GENERATION WIRELESS NETWORKS," filed Dec. 20, 2018, 62/805,029, entitled "SYSTEMS AND METHODS FOR SUPER LOW LATENCY LOCATION SERVICE FOR FIFTH GENERATION WIRELESS NETWORKS," filed Feb. 13, 2019, and 62/945,664, entitled "SYSTEMS AND METHODS FOR LOCATION REPORTING WITH LOW LATENCY FOR WIRELESS NETWORKS," filed Dec. 9, 2019, which are assigned to the assignee thereof and which are expressly incorporated herein by reference in their entireties.

BACKGROUND

Field

The present disclosure relates generally to communication, and more specifically to techniques for supporting location services for user equipments (UEs).

Relevant Background

Certain location user cases require very low latency in provision of a location of a mobile device to an external client. Examples include: smart (automated) factories and warehouses where the positions of tools, objects being fabricated and packages may need to be known with an accuracy of 10 centimeters (cms) or less and with a latency of less than 1 second; drones where a location accurate to 1 meter may need to be known within a second; public safety first responders at a dangerous location (e.g. inside a burning or partially collapsed building); and user cases associated with moving vehicles and pedestrians (known as V2X). Other user cases associated with very high location accuracy may also have very low latency requirements due to a rapid deterioration in location accuracy for a moving object. For example, even at only 4 mph (normal walking speed), an object would move 1.79 meters in 1 second, thereby nullifying the benefit of 1 meter location accuracy after less than 1 second.

Current location solutions can have a latency of 5 to 10 seconds or more and no location solutions for wireless networks are known with a latency consistently less than 1 second with the exception of solutions using mobile device based positioning where the mobile device or an App in the mobile device is also the client for the determined locations.

SUMMARY

Methods and techniques are described for reducing end-to-end latency in a location determination of a user equipment (UE). Location requests from an external client for a UE may be supported using control plane signaling as it may be performed only infrequently. An external client requests the location of a UE using control plane signaling. The UE sends downlink location measurements such as Reference Signal Time Differences, for a plurality of base stations (BSs) to a serving BS at a layer 1 or layer 2 protocol level and at first periodic intervals. The UE and the plurality of BSs send additional location measurements, such as receive time-transmission time differences, to the serving BS at second periodic intervals, which are longer than the first periodic intervals. The serving BS uses the additional location measurements and downlink location measurements to determine timing information, such as Real Time Differences, for the plurality of BSs. The serving BS determines the location of the UE using the downlink location measurements and the timing information at the first periodic intervals and sends the location to the external client using user plane signaling to reduce delay.

In one implementation, a method for locating a user equipment (UE) performed by a location server function located at a serving base station for the UE in a Radio Access Network (RAN) includes receiving a request for locating the UE, wherein the request for locating the UE is based on a location request initiated by an external client and is received using control plane signaling; receiving location information from the UE at a layer 1 (L1) or layer 2 (L2) protocol level; calculating a location of the UE using the location information; and sending a location report including the location of the UE to the external client using user plane signaling.

In one implementation, a location server function located at a serving base station for a user equipment (UE) in a Radio Access Network (RAN) and capable of locating the UE, the location server function includes an external interface configured to communicate with one or more base stations in the RAN, one or more network nodes, and one or more UEs; at least one memory; at least one processor coupled to the external interface and the at least one memory, wherein the at least one processor is configured to: receive, via the external interface, a request for locating the UE, wherein the request for locating the UE is based on a location request initiated by an external client and is received using control plane signaling; receive, via the external interface, location information from the UE at a layer 1 (L1) or layer 2 (L2) protocol level; calculate a location of the UE using the location information; and send, via the external interface, a location report including the location of the UE to the external client using user plane signaling.

In one implementation, a location server function located at a serving base station for a user equipment (UE) in a Radio Access Network (RAN) and configured for locating the UE, the location server function includes means for receiving a request for locating the UE, wherein the request for locating the UE is based on a location request initiated by an external client and is received using control plane signaling; means for receiving location information from the UE at a layer 1 (L1) or layer 2 (L2) protocol level; means for calculating a location of the UE using the location information; and means for sending a location report including the location of the UE to the external client using user plane signaling.

In one implementation, a non-transitory computer readable medium including program code stored thereon, the program code is operable to configure at least one processor in a location server function located at a serving base station for a user equipment (UE) in a Radio Access Network (RAN) and configured for locating the UE, comprising: program code to receive a request for locating the UE, wherein the request for locating the UE is based on a location request initiated by an external client and is received using control plane signaling; program code to receive location information from the UE at a layer 1 (L1) or layer 2 (L2) protocol level; program code to calculate a location of the UE using the location information; and program code to send a location report including the location of the UE to the external client using user plane signaling.

In one implementation, a method for locating a user equipment (UE) performed by the UE, includes receiving a first request for first location measurements and a second request for second location measurements from a serving base station in a Radio Access Network (RAN); sending the first location measurements to the serving base station at a layer 1 (L1) or layer 2 (L2) protocol level at first periodic intervals; sending the second location measurements to the serving base station at second periodic intervals, wherein the first periodic intervals are shorter than the second periodic intervals.

In one implementation, a user equipment (UE) capable of supporting locating the UE, the UE includes a wireless transceiver configured to wirelessly communicate with base stations in a Radio Access Network (RAN); at least one memory; at least one processor coupled to the wireless transceiver and the at least one memory, wherein the at least one processor is configured to: receive, via the wireless transceiver, a first request for first location measurements and a second request for second location measurements from a serving base station in a Radio Access Network (RAN); send, via the wireless transceiver, the first location measurements to the serving base station at a layer 1 (L1) or layer 2 (L2) protocol level at first periodic intervals; and send, via the wireless transceiver, the second location measurements to the serving base station at second periodic intervals, wherein the first periodic intervals are shorter than the second periodic intervals.

In one implementation, a user equipment (UE) capable of supporting locating the UE, the UE includes means for receiving a first request for first location measurements and a second request for second location measurements from a serving base station in a Radio Access Network (RAN); means for sending the first location measurements to the serving base station at a layer 1 (L1) or layer 2 (L2) protocol level at first periodic intervals; and means for sending the second location measurements to the serving base station at second periodic intervals, wherein the first periodic intervals are shorter than the second periodic intervals.

In one implementation, a non-transitory computer readable medium including program code stored thereon, the program code is operable to configure at least one processor in a user equipment (UE) capable of supporting locating the UE, comprising: program code to receive a first request for first location measurements and a second request for second location measurements from a serving base station in a Radio Access Network (RAN); program code to send the first location measurements to the serving base station at a layer 1 (L1) or layer 2 (L2) protocol level at first periodic intervals; and program code to send the second location measurements to the serving base station at second periodic intervals, wherein the first periodic intervals are shorter than the second periodic intervals.

BRIEF DESCRIPTION OF THE DRAWINGS

An understanding of the nature and advantages of various embodiments may be realized by reference to the following figures.

Figure 1:
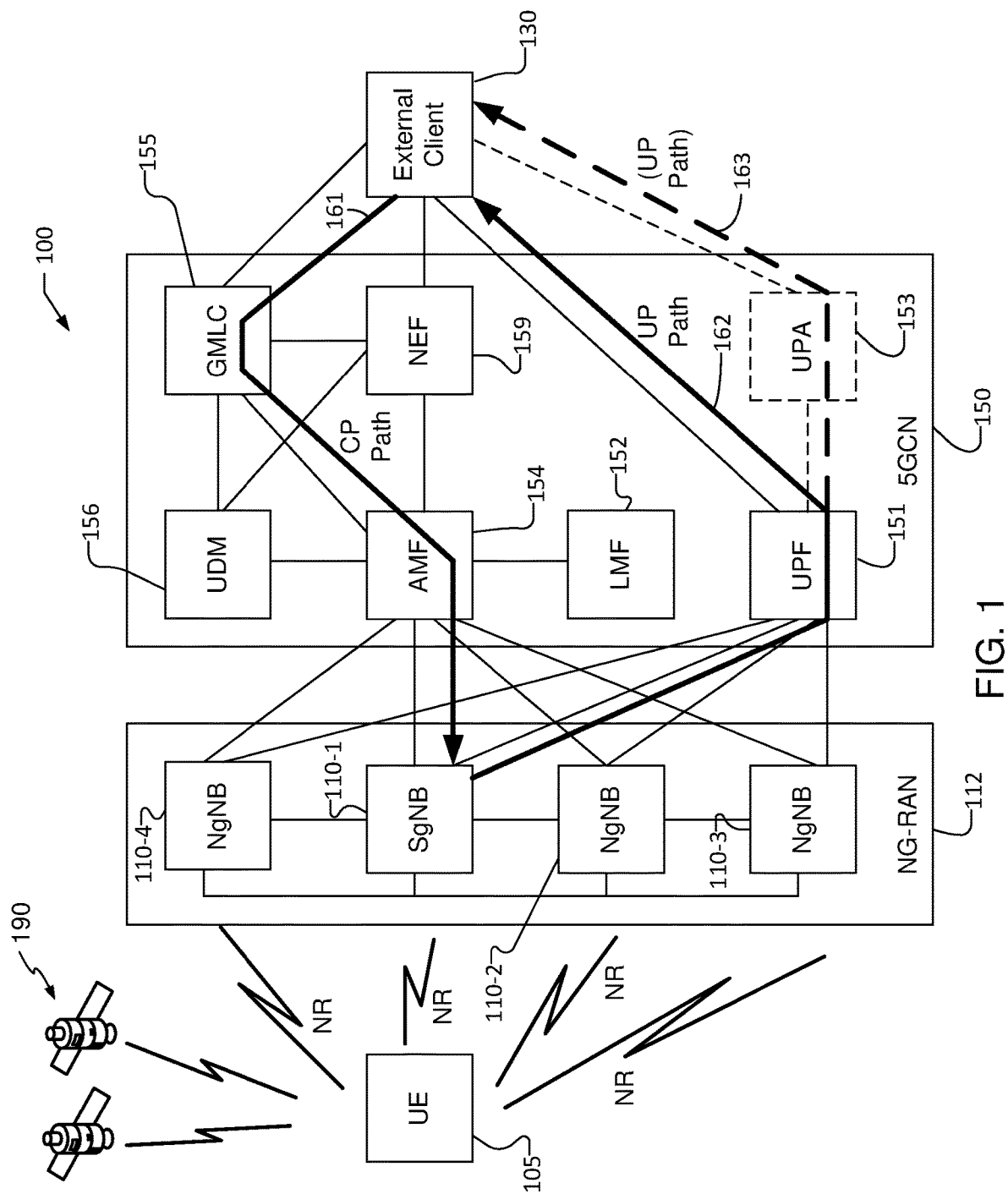
FIG. 1 is a simplified block diagram illustrating a network architecture to support a Super Low Latency Location Service (SLLLS) for a non-roaming UE.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

A user equipment (UE) for Industrial IoT (IIoT) may be, or may be attached to or embedded inside, some tool, object, part, or component being used in a smart (automated) factory or may be attached to or embedded inside a package, object or component in a smart (automated) warehouse or supply depot. Such UEs may need to be located with high accuracy in order to allow fast, efficient and smooth operation of the smart factory, warehouse or supply depot. Possible location requirements (e.g. as identified by the Third Generation Partnership Project (3GPP)) may include: (1) very high location accuracy (e.g. a maximum 1-10 cm location error); (2) very low latency in obtaining and reporting a UE location to an external client (e.g. less than 1 second and possibly less than 100 milliseconds (ms)); and (3) low cost or limited cost in supporting location for all UEs. No existing solutions for wireless networks appear able to achieve all three of these objectives. However, location support in association with a wireless network (e.g. a 5G wireless network) may be attractive for smart factories and warehouses due to an ability to use a wireless network to also control the operation of smart factories and warehouses via high speed, high bandwidth and low latency data communication between moving elements (such as objects, tools, parts, packages) and the servers which monitor and control these moving elements.

One implementation of location support suitable for IIoT, and other uses, that may achieve the three objectives listed above as part of a Fifth Generation (5G) wireless network, may use one or more of five separate components as described below.

Component 1: A target device (e.g. a factory tool) with an embedded UE sends 5G Reference Signal Time Difference (RSTD) or other location measurements to a serving base station (SBS) for the embedded UE with low latency and at low periodic intervals (e.g. every 50-200 ms) at a layer 1 (L1) or layer 2 (L2) protocol level. Use of layer 1/layer 2 (L1/L2) signaling may reduce latency and enable lower periodic intervals (also referred to as lower periodicity or higher frequency) of reporting than using higher protocol levels, such as a layer 3 (L3) which may correspond to a Radio Resource Control (RRC) protocol layer. Use of L1/L2 signaling may be used by a UE when in an RRC connected state. For a UE is in an RRC Idle state or RRC Inactive state, the UE may send RSTD or other location measurements to an SBS at an L3 level (e.g. using RRC) and may reduce latency by not entering an RRC connected state. Note that the terms "protocol layer" and "protocol level" are used interchangeably herein.

Component 2: Location reports may be ciphered if not otherwise ciphered at L1/L2 to ensure privacy. Ciphering keys may be provided by higher protocol layers (e.g. using a Non-Access Stratum (NAS) protocol layer from a serving Access and Mobility Management Function (AMF) or an RRC layer from an SBS).

Component 3: The SBS for a target UE calculates the UE location at low periodic intervals (e.g. every 50-200 ms) using Observed Time Difference Of Arrival (OTDOA) applied to RSTD measurements received from the UE, and sends the UE location to an external client (e.g. which may be part of a factory server or controller) at a user plane level (e.g. using TCP/IP) to reduce latency.

Component 4: Other base stations and the UE may send location measurements, such as time of arrival (TOA) measurements and/or receive time-transmission time difference (Rx-Tx) measurements (and possibly ADA/ADD measurements), to the SBS at higher periodic intervals (also referred to as higher periodicity or lower frequency) (e.g. every 1-5 seconds). The higher periodic intervals may be used because base station to base station (BS) communication may occur at higher protocol layers and may pass through intermediate entities (e.g. other BSs), which will increase latency. The SBS may use the location measurements, e.g., TOA or Rx-Tx measurements, to calculate a Round Trip signal propagation Time (RTT) between the UE and each BS. The RTTs are then combined with the RSTD measurements from Component 1 to compute Real Time Differences (RTDs) between BSs (using known equations), which are needed to compute location using OTDOA as part of Component 3. Generally, RTDs will be stable, so the calculation of RTDs is mainly to verify the stability and detect any small changes. This may amount to periodic RTD recalibration. In particular, while individual UE locations may be calculated and reported with higher frequency according to components 1-3, RTDs, to enable component 3, can be obtained at lower frequency according to component 4.

Component 5: Rx-Tx measurements for Component 4 can be obtained from multiple UEs (e.g. for the same SBS) and used to determine (or recalibrate) the same RTDs, which can reduce load on individual UEs and on BSs and improve accuracy, latency and reliability of RTD determination or recalibration.

The derivation of RTDs according to Components 4 and 5 avoids the need for costly synchronization of BSs using other methods (e.g. using a GPS receiver in each BS with an external antenna). In an indoor millimeter wave Radio Frequency environment with Line of Sight (LOS) between UEs and BSs, location accuracy using OTDOA can be very high due to an ability to use very high bandwidth signals (e.g. 100-400 Mega Hertz or more). Likewise, latency with user plane transfer from an SBS to a nearby external client can be very low.

Thus, to minimize latency, a request for locating a UE from an external client may be received by a location server function at an SBS for the UE using control plane signaling. Location requests from an external client may be supported using control plane signaling without affecting latency as a location request for a UE may be performed only once or infrequently. The location information from the UE may be received by the SBS at an L1 or L2 protocol level, which may be, e.g., RSTD measurements. Ciphering of the location information may be used for privacy considerations. The location of the UE may be determined using the location information and reported to the external client using user plane signaling to minimize delay.

Additional location information may be provided by the UE, e.g., Rx-Tx measurements for a plurality of base stations. The location server function in the SBS may receive measurements, e.g., TOA or Rx-Tx measurements, from each of the plurality of base stations for uplink (UL) signals transmitted by the UE. Using the additional measurements received from the UE and from the base stations, the location server function may determine timing information, e.g., RTDs, for the plurality of base stations, which can be used to assist in determining the location of the UE. If desired, measurements for other UEs may be used to determine the timing information for the base stations.

The UE may send first locations measurements, e.g., the RSTD measurements, with a first periodic interval, and send second location measurements, e.g., the Rx-Tx measurements, at a second periodic interval. However, because the second measurements (and the measurements from the base stations of the UE's UL signals) are used to determining timing information, e.g., RTD, which is relatively stable, the first periodic interval may be shorter than the second periodic interval and may be shorter than the interval at which UL signals are transmitted by the UE.

FIG. 1 shows a network architecture to support a Super Low Latency Location Service (SLLLS) for a non-roaming UE and may align with a 3GPP location solution expected in Release 16 in the 5GCN and NG-RAN with some small extensions.

FIG. 1 illustrates a communication system 100 that comprises a UE 105, which is referred to here as a "target UE", since UE 105 may be the target of a location request. FIG. 1 also shows components of a Fifth Generation (5G) network, comprising a Next Generation Radio Access Network (NG-RAN) 112, which includes base stations (BSs) sometimes referred to as New Radio (NR) NodeBs or gNBs 110-1, 110-2, 110-3, and 110-4 (collectively and generically referred to herein as gNBs 110), and a 5G Core Network (5GCN) 150 that is in communication with an external client 130. A 5G network may also be referred to as a New Radio (NR) network or 5G System (5GS); NG-RAN 112 may be referred to as an NR RAN or a 5G RAN; and 5GCN 150 may be referred to as an Next Generation (NG) Core network (NGC). The communication system 100 may (e.g. when operating partially or completely outdoors or when outdoor antennas are available) further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 also shows a serving gNB (SgNB) 110-1 for the target UE 105 and neighbor gNBs (NgNBs) 110-2, 110-3, 110-4. A NgNB 110 may be any gNB 110 which is able to receive and measure uplink (UL) signals transmitted by the target UE 105 and/or is able to transmit a downlink (DL) reference signal (RS) that can be received and measured by the target UE 105. The SgNB 110-1 supports a location server function which may be referred to as a Location Management Component (LMC) or a Local Location Management Function (LLMF). Functions supported by the SgNB 110-1 may include one or more of receiving a request for the location of the target UE 105 from an AMF 154; coordinating the location of the target UE 105 by obtaining a series of location estimates for the target UE (e.g. periodic or triggered locations); configuring location measurements for the target UE 105 in other gNBs 110 (e.g. NgNBs 110) and/or in the target UE 105; configuring transmission of UL signals (e.g. UL RSs) by the target UE 105 (to be measured by gNBs 110) and/or transmission of DL RSs by gNBs 110 (to be measured by the target UE 105); receiving location measurements for the target UE 105 from the target UE 105 and/or from other gNBs 110; computing a location estimate for the target UE 105; transferring the location estimate to the external client 130; and supporting a change of SgNB 110-1 due to mobility of the target UE 105 to a new SgNB 110-1.

The SgNB 110-1 itself may perform the location server function, or a physically separate server that does not support gNB functions, but that is located at, and/or is connected to, the SgNB 110-1, may perform the location server functions. Such a physically separate location server function may be referred to as an LMC server or LLMF server. For ease of reference, the SgNB 110-1 will be described herein as performing the location server functions. All, or a subset of, the controlling functions for the location service can be performed by the SgNB 110-1 or some controlling functions may be performed by another NgNB 110 or some more distant gNB 110.

FIG. 1 also shows a User Plane Aggregator (UPA) 153. The UPA 153 is optional and enables an external client 130 to receive location reports for target UEs by interacting only with the UPA 153. When a UPA 153 is not present, an external client 130 would need to interact with the SgNB 110-1 for each target UE for which the external client 130 has instigated location reporting, which may be less efficient (e.g. when the SgNB 110-1 for a target UE 105 is changed) and/or may be a security risk for SgNBs and/or the external client 130. The UPA 153 avoids the need for a SgNB 110-1 to establish location reporting sessions to multiple external clients and for external clients to establish location reporting sessions to multiple SgNBs. The UPA 153 may also provide security for the NG-RAN 112 and/or the external client 130 by authenticating and authorizing the external client 130 and/or SgNB 110-1. The UPA 153 may be part of the 5GCN 150 or may be external to the 5GCN 150 (e.g. may be associated with the external client 130).

The NG-RAN 112 may also include location measurement units (LMUs) (not shown in FIG. 1), which can receive and measure signals from the target UE 105 but do not transmit signals to UEs for normal network operation, and/or location transmission units (LTUs) (not shown in FIG. 1), which transmit reference signals to be measured by the target UE 105 but do not receive signals from UEs for normal network operation. An LMU or LTU may be connected to one or more other gNBs 110 and/or to an AMF 154. An LMU and LTU may be combined in the same physical entity. An LTU and/or LMU may also perform some location server functions.

Entities in the NG-RAN 112 which transmit DL reference signals (RSs) to be measured by a target UE 105 for a particular location session are referred to generically as "Transmission Points" (TPs) and can include one or more of the SgNB 110-1, NgNBs 110-2, 110-3, 110-4, and LTUs (not shown). In some cases, SgNB 110-1, NgNBs 110, and/or LTUs may each include multiple TPs (e.g. where each TP is associated with a distinct cell and/or uses a distinct antenna or distinct set of antenna elements).

Entities in the NG-RAN which receive and measure UL signals (e.g. an RS) transmitted by a target UE 105 for a particular location session are referred to generically as "Reception Points" (RPs) and can include one or more of the SgNB 110-1, NgNBs 110-2, 110-3, 110-4, and LMUs (not shown). In some cases, SgNB 110-1, NgNBs 110, and/or LMUs may each include multiple RPs (e.g. where each RP is associated with a distinct cell and/or uses a distinct antenna or distinct set of antenna elements).

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an or as a Radio Access Network (RAN), denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The target UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 105 may be a standalone device or may be embedded in another device, e.g., a factory tool, that is to be monitored or tracked. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 1, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 110). UE 105 or SgNB 110-1 to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, Angle of Departure (AOD), Angle of Arrival (AOA), multi-cell Round Trip signal propagation Time (multi-RTT), or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

An SgNB 110-1, or other location server (e.g. LMC server or LLMF server), may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA, AOD, multi-RTT and ECID. The facilitation may include improving signal acquisition and measurement accuracy by UE 105 and, in some cases, enabling UE 105 to compute its estimated location based on the location measurements. For example, an LMC server, LLMF server or other location server (e.g. SgNB 110-1) may comprise an almanac, also referred to as a base station almanac (BSA), which indicates locations and identities of cellular transceivers (e.g. gNBs 110) and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 105 and a cellular transceiver (e.g. a gNB 110) or a local transceiver (e.g. a WiFi access point (AP)). A UE 105 may transfer these measurements to a location server, such as SgNB 110-1, to determine a location for UE 105, or in some implementations, may use these measurements together with assistance data (e.g. terrestrial almanac data or GNSS satellite data such as GNSS Almanac and/or GNSS Ephemeris information) received from an LMC server, LLMF server or other location server (e.g. SgNB 110-1) or broadcast by a base station (e.g. a gNB 110) in NG-RAN 112 to determine a location for UE 105.

In the case of OTDOA, UE 105 may measure a Reference Signal Time Difference (RSTD) between signals such as a positioning reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to an LMC server, LLMF server or other location server (e.g. SgNB 110-1) which may compute an estimated location for UE 105 based on known locations and known signal timing for the measured transceivers.

In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time. In the techniques described herein, accurate synchronization of gNBs 110 may not be needed due to an ability to obtain RTDs between pairs of gNBs 110. Such RTDs may also be used to help accurately (or approximately) synchronize the gNBs 110 without the need for a GPS or GNSS receiver in each gNB 110.

In some implementations, network based position methods may be used to locate a target UE 105. With these methods, entities in a network such as gNBs 110 and/or LMUs may measure UL signals transmitted by UE 105. The UL signals may include or comprise UL reference signals such as UL positioning reference signals (PRSs). The entities obtaining the location measurements (e.g. gNBs 110 and/or LMUs) may then transfer the location measurements to a location server (e.g. SgNB 110-1), which may compute a location for the target UE 105. Examples of UL location measurements can include an RSSI, RSRP, RSRQ, TOA, Rx-Tx, AOA and RTT. Examples of a position method may include an Uplink Time Difference of Arrival (UTDOA) method which may make use of TOA measurements obtained by gNBs 110 and/or LMUs whose timing is accurately synchronized or aligned with a common absolute time such as GPS time. Another example position method may be ECID which may make use of any of RSSI, RSRP, RSRQ, TOA, Rx-Tx, AOA and RTT measurements.

With a UE assisted position method, UE 105 may obtain location measurements (e.g. measurements of RSSI, Rx-Tx, RTT, RSTD, RSRP and/or RSRQ for gNBs 110, or measurements of GNSS pseudorange, code phase and/or carrier phase for SVs 190) and send the measurements to an entity performing a location server function, such as SgNB 110-1 for computation of a location estimate for UE 105. With a UE based position method, UE 105 may obtain location measurements (e.g. which may be the same as or similar to location measurements for a UE assisted position method) and may additionally compute a location of UE 105 (e.g. with the help of assistance data received by point to point means from a location server such as SgNB 110-1 or broadcast by a gNB 110).

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE 105 may include a linear velocity, an angular velocity, a linear acceleration, an angular acceleration, an angular orientation for the UE 105, e.g., the orientation of the UE 105 relative to a fixed global or local coordinate system, an identification of a trigger event for locating the UE 105, or some combination of these. For example, trigger events may include an area event, a motion event or a velocity event. An area event, for example, may be the UE 105 moving into a defined area, moving out of the area and/or remaining in the area. A motion event, for example, may include movement of the UE 105 by a threshold straight line distance or threshold distance along a UE 105 trajectory. A velocity event, for example, may include the UE 105 attaining a minimum or maximum velocity, a threshold increase and/or decrease of velocity, and/or a threshold change in direction. In the description contained herein, the use of the term location may comprise any of these variants unless indicated otherwise. When computing the location of a UE 105, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G (e.g. NR). In FIG. 1, the serving gNB for UE 105 (SgNB) is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons (referred to here as LTUs) which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs), or other types of base stations or access points. As an example, NG-RAN 112 may include one or more next generation eNBs (ng-eNBs), not shown in FIG. 1, which provide LTE wireless access to UE 105 and may connect to entities in 5GCN 150 such as AMF 154.

The gNBs 110 and/or the ng-eNBs can communicate with the Access and Mobility Management Function (AMF) 154, which, for positioning functionality, may communicate with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105 supported by the UPF 151. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 or SgNB 110-1 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning, multi-RTT, UTDOA, and/or other position methods. The SgNB 110-1 or LMF 152 may also process location service requests for the UE 105, e.g., received directly or indirectly from the GMLC 155 or NEF 159. In some embodiments, a node/system that implements the SgNB 110-1 and/or LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130 and may forward such a location request to a serving AMF 154 for UE 105. The AMF 154 may then forward the location request to SgNB 110-1 which may obtain one or more location estimates for UE 105 (e.g. according to the request from external client 130) and may return the location estimate(s) to external client 130 via UPF 151 and UPA 153 if present. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

The SgNB 110-1 and UE 105 may communicate, for location purposes, using the LTE Positioning Protocol (LPP) defined in 3GPP Technical Specification (TS) 36.355 or TS 37.355, where LPP messages are transferred in Radio Resource Control (RRC) transport messages between the UE 105 and the SgNB 110-1. The LPP protocol may be used to support positioning of UE 105 using UE assisted and/or UE based position methods such as Assisted GNSS (A-GNSS), Real Time Kinematic (RTK), Wireless Local Area Network (WLAN), Observed Time Difference of Arrival (OTDOA), multi-RTT, AOD, AOA, sensors, and/or Enhanced Cell Identity (ECID).

GNBs 110 may communicate with AMF 154 using a Next Generation Application Protocol (NGAP), e.g. as defined in 3GPP TS 38.413. NGAP may enable AMF 154 to request a location of a target UE 105 from an SgNB 110-1 for target UE 105 and may enable SgNB 110-1 to return a location for UE 105 to the AMF 154 and/or to confirm a request for a location of a target UE 105.

GNBs 110 may communicate with one another using an Xn Application Protocol (XnAP), e.g. as defined in 3GPP TS 38.423. XnAP may allow one gNB 110 to request another gNB 110 to obtain UL location measurements for a target UE and to return the UL location measurements. XnAP may also enable a gNB 110 to request another gNB 110 to transmit a downlink (DL) RS or PRS to enable a target UE to obtain DL location measurements of the transmitted DL RS or PRS. In some implementations, XnAP may be used to transport location related messages belonging to a higher protocol level (e.g. the NR Positioning Protocol A (NRPPa) defined in 3GPP TS 38.455) between gNBs 110 to request UL location measurements and/or transmission of DL RS or PRS signals, in which case XnAP may only be used as a transport protocol between pairs of gNBs 110.

A gNB (e.g. SgNB 110-1) may communicate with a target UE 105 using a Radio Resource Control (RRC) protocol, e.g. as defined in 3GPP TS 38.331. RRC may allow a gNB 110 (e.g. SgNB 110-1) to request location measurements from the target UE 105 of DL RSs or DL PRSs transmitted by the gNB 110 and/or by other gNBs 110 and to return location measurements. RRC may also enable a gNB 110 (e.g. SgNB 110-1) to request the target UE 105 to transmit an UL RS or PRS to enable the gNB 110 and/or other gNBs 110 to obtain UL location measurements of the transmitted UL RS or PRS. A gNB (e.g. SgNB 110-1) may further communicate with a target UE 105 using lower protocol levels, e.g., L1 and L2 protocol levels, which may be used by the UE 105 to return location measurements. As described previously, RRC may also be used to transport LPP messages between a UE 105 and SgNB 110-1. For example, an LPP message or an RRC message may be used by SgNB 110-1 to request location measurements from the target UE 105 and/or to request a target UE 105 to transmit an UL RS or PRS.

Information provided by other gNBs 110 to the SgNB 110-1, e.g. using XnAP or NRPPa transported by XnAP, may include timing and configuration information for PRS transmission and location coordinates of the gNBs 110. The SgNB 110-1 can then provide some or all of this information to the UE 105 as assistance data in an RRC message, LPP message or via broadcast. An RRC message sent from SgNB 110-1 to UE 105 may include an embedded LPP message in some implementations, when LPP is used.

An RRC and/or LPP message sent from the SgNB 110-1 to the UE 105 may instruct the UE 105 to do any of a variety of things, depending on desired functionality. For example, the LPP and/or RRC message could contain an instruction for the UE 105 to obtain measurements for GNSS (or A-GNSS), WLAN, AOD, multi-RTT, and/or OTDOA (or some other position method) or to transmit uplink (UL) signals, such as Positioning Reference Signals, Sounding Reference Signals (SRSs), or both. In the case of OTDOA, the LPP and/or RRC message may instruct the UE 105 to obtain one or more measurements (e.g. RSTD measurements) of PRS signals transmitted within particular cells supported by particular gNBs 110. The UE 105 may send the measurements back to the SgNB 110-1 in an RRC and/or LPP message or at a lower protocol level, e.g., an L1 or L2 protocol level.

In some embodiments, LPP may be augmented by or replaced by an NR or NG positioning protocol (NPP or NRPP) which supports position methods such as OTDOA, AOD, multi-RTT, and ECID for NR radio access. For example, an LPP message may contain an embedded NPP message or may be replaced by an NPP message.

A gNB 110 in NG-RAN 112 may also broadcast positioning assistance data to UEs such as UE 105.

As illustrated in FIG. 1, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management.

To support services including location services from external clients 130, a Network Exposure Function (NEF) 159 may be included in 5GCN 150. An NEF may also be referred to as a Service Capability Exposure Function (SCEF), e.g. for a UE 105 with LTE access to an Enhanced Packet Core (EPC) rather than 5G NR radio access to 5GCN 150. The NEF 159 may support secure exposure of capabilities and events concerning 5GCN 150 and UE 105 to an external client 130 (which may then be referred to as an Application Function (AF)) and may enable secure provision of information from external client 130 to 5GCN 150. In the context of location services, NEF 159 may function to obtain a current or last known location for a UE 105, may obtain an indication of a change in location for a UE 105, or an indication of when a UE 105 becomes available (or reachable). An external client 130 may access NEF 159 directly or may access a Services Capability Server (SCS, not shown in FIG. 1), which may access NEF 159 on behalf of external client 130 in order to provide location information to the external client 130 for UE 105 via the SCS. The NEF 159 may be connected to the GMLC 155 to support last known location, current location and/or deferred periodic and triggered location for the UE 105. If desired, the NEF 159 may include, or may be combined with, the GMLC 155.

The User Plane Function (UPF) 151 may support voice and data bearers for UE 105 and may enable UE 105 voice and data access to other networks such as the Internet. UPF 151 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. A location report for UE 105, e.g., including a location estimate determined by the SgNB 110-1, may be returned by SgNB 110-1 to the external client 130 via the UPF 151 and UPA 153 if present.

It should be understood that while FIG. 1 shows a network architecture for a non-roaming UE, with suitable well-known changes, a corresponding network architecture may be provided for a roaming UE.

FIG. 1 illustrates at a high level via the bold arrows how a location session may be established and how location reporting may be supported by the SgNB 110-1. To establish (or to cancel) a location session for a target UE 105, a control plane (CP) signaling path may be used as shown by the bold arrow 161. With a control plane path, control plane procedures may be used in which an external client 130 sends a location request to a GMLC 155 or to an NEF 159, which forwards the location request to a serving AMF 154 for the target UE 105. The serving AMF 154 then forwards the location request to the SgNB 110-1 for the target UE 105 which acts as the location server function for the location session. FIG. 1 only shows the location establishment via the GMLC 155 and not via the NEF 159. For location reporting, a user plane (UP) signaling path may be used as shown by the bold arrows 162 and 163. With a user plane signaling path, the SgNB 110-1 sends location reports to the external client 130 through a UPF 151 via either a user plane connection between the SgNB 110-1 and the external client 130 when a UPA 153 is not used, or a user plane connection between the SgNB 110-1 and the UPA 153 and a second user plane connection between the UPA 153 and the external client 130 when a UPA 153 is used. The UPF 151 may support a Protocol Data Unit (PDU) session to SgNB 110-1 (but not in this case to UE 105), which may enable IP (and possibly Local Area Network (LAN)) access from SgNB 110-1 to external networks and entities such as external client 130. The user plane connection(s) can use ciphering and mutual authentication when the two endpoints are not in the same trust domain. This would typically occur for a user plane connection between the SgNB 110-1 and the external client 130, between the SgNB 110-1 and the UPA 153 when the UPA 153 is outside the 5GCN 150, or between the UPA 153 and the external client 130 when the UPA 153 is inside the 5GCN 150.

For location reporting via a user plane from a SgNB 110-1, the UE 105 may need to remain in a Connection Management (CM) Connected state and in an RRC Connected state or RRC Inactive state in order for the UE 105 to always have an SgNB 110-1. If the target UE 105 were to transition into a CM Idle state, the SgNB 110-1 might not be able to access the target UE 105 (e.g. to reconfigure DL location measurements or transmission of UL signals by the target UE 105) and might not know which gNBs 110 and LMUs to configure to obtain UL location measurements of UE 105. The target UE 105 can be kept in CM Connected state if the serving AMF 154 for the target UE 105 remains aware of the positioning session and avoids placing the target UE 105 in CM Idle state.

Figure 2:
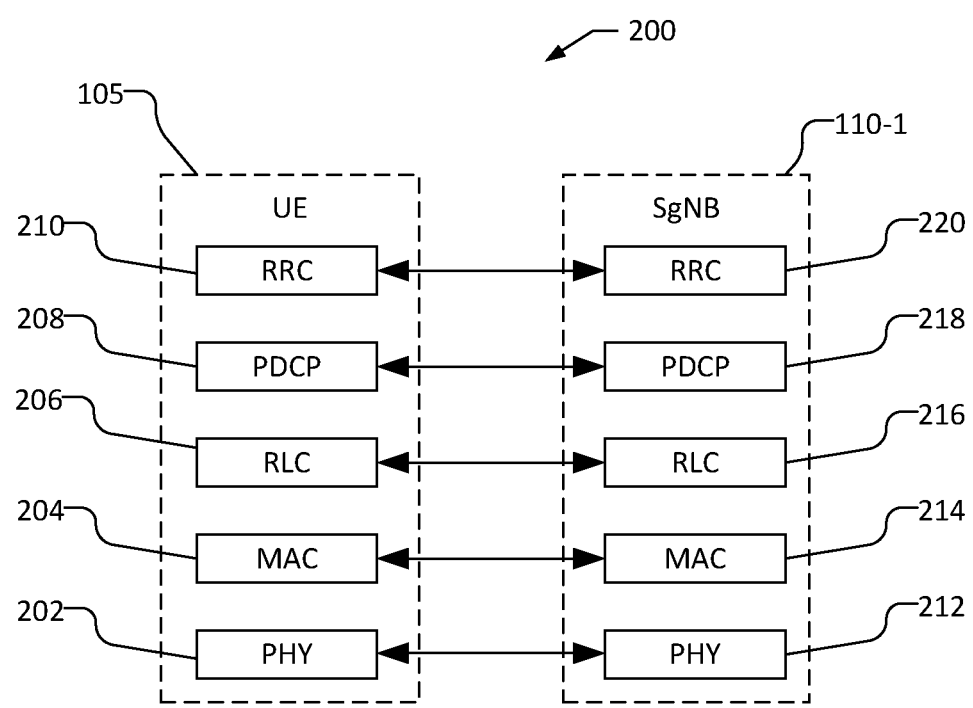
FIG. 2 is a representation of a protocol stack for the control plane between a UE and a serving base station.

FIG. 2 illustrates a protocol stack 200 for control plane signaling between UE 105 and the SgNB 110-1. Layer 1 (L1) of the protocol stack 200 is the physical layer (PHY) whose endpoints are shown as 202 and 212 in FIG. 2. Layer 2 (L2) is split into the following sublayers: (i) Medium Access Control (MAC) with endpoints 204 and 214; (ii) Radio Link Control (RLC) with endpoints 206 and 216; and (iii) Packet Data Convergence Protocol (PDCP) with endpoints 208 and 218. The physical layer (PHY) offers to the MAC sublayer data and signaling transfer services via transport channels, signaling of hybrid automatic repeat request (HARQ) feedback, and signaling of a scheduling request. The MAC sublayer offers to the RLC sublayer logical channels, data and signaling transfer and radio resource allocation. The RLC sublayer offers to the PDCP sublayer data transfer in unacknowledged mode (UM), acknowledged mode (AM) and transparent mode (TM). The PDCP offers to the RRC layer transfer of user plane data, transfer of control plane data, header compression, ciphering and integrity protection. The RRC protocol, when used, makes use of the PDCP layer and has endpoints 210 and 220 in the UE 105 and SgNB 110-1, respectively, as shown in FIG. 2.

For a UE 105 in an RRC connected state with an SgNB 110-1 (e.g. where a signaling association or connection may exist between the UE 105 and the SgNB 110-1), location measurement information obtained by UE 105 may be transferred to SgNB 110-1 at the physical (PHY) layer (L1) by encoding the location measurement information into a bit sequence (e.g. which may include additional forward error correction bits) which is included in one or more UL subframes transmitted by UE 105, where transmission of the UL subframes by UE 105 was previously authorized by SgNB 110-1. The bit sequence may also include an identification for UE 105 and/or an identification of a location session for UE 105 and possibly additional bits to enable authentication of the identification(s) by SgNB 110-1. The location measurement information may also be ciphered by UE 105 (e.g. using a ciphering key previously provided to UE 105 by SgNB 110-1).

As an alternative, for a UE 105 in an RRC connected state with an SgNB 110-1, location measurement information obtained by UE 105 may be transferred to SgNB 110-1 at the RLC layer or PDCP layer (L2) by inclusion in an RLC Control Protocol Data Unit (PDU) or PDCP Control PDU, respectively. Transfer at the PDCP level may be ciphered and authenticated by the PDCP layer and may not require extra ciphering and authentication of the location measurements. However, transfer at the RLC level may require UE 105 to include additional information for identification of UE 105, identification of a location session, authentication of the identification(s), and to cipher the location measurement information, as described previously for transfer of location measurement information at the PHY layer. For transfer at the PHY or RLC layer, SgNB 110-1 may authenticate the information using any authentication information and decipher the location measurement information if this is ciphered. The benefit of transferring location measurement information at a PHY, RLC or PDCP layer may include reduced latency due to processing fewer protocol layers by UE 105 and SgNB 110-1 and an ability to send information in any available UL signaling subframes for UE 105.

For a UE 105 in an RRC Inactive state (e.g. where the UE 105 may have a serving gNB 110-1 but no signaling connection to the SgNB 110-1), UE 105 may commence a message exchange with SgNB 110-1 by sending a request (e.g. a Random Access Channel (RACH) request) to SgNB 110-1 or to another gNB 110 for permission to send an RRC message. The request may be sent on a common control channel (e.g. a RACH channel). SgNB 110-1 or the other gNB 110 may return an RRC message indicating permission to send the RRC message and providing UL transmission resources to send the RRC message (e.g. such as available UL subframes and available bandwidth). UE 105 may then transmit the RRC message on a common control channel and may include the location measurement information which may be ciphered, an identification for UE 105 (e.g. which may include an identification for SgNB 110-1), an identification for a location session and additional information to enable authentication of the identification(s) by SgNB 110-1. Since the RRC message is the third message transferred between the UE 105 and SgNB 110-1 in this message exchange, it may be referred to as a "message 3". In the case of sending the RRC message to another gNB 110, the other gNB 110 may forward the location measurement information, identification of UE 105, identification of the location session and additional authentication information to SgNB 110-1. SgNB 110-1 may then authenticate the location measurement information using the authentication information and decipher the location information if this is ciphered.

Figure 3:
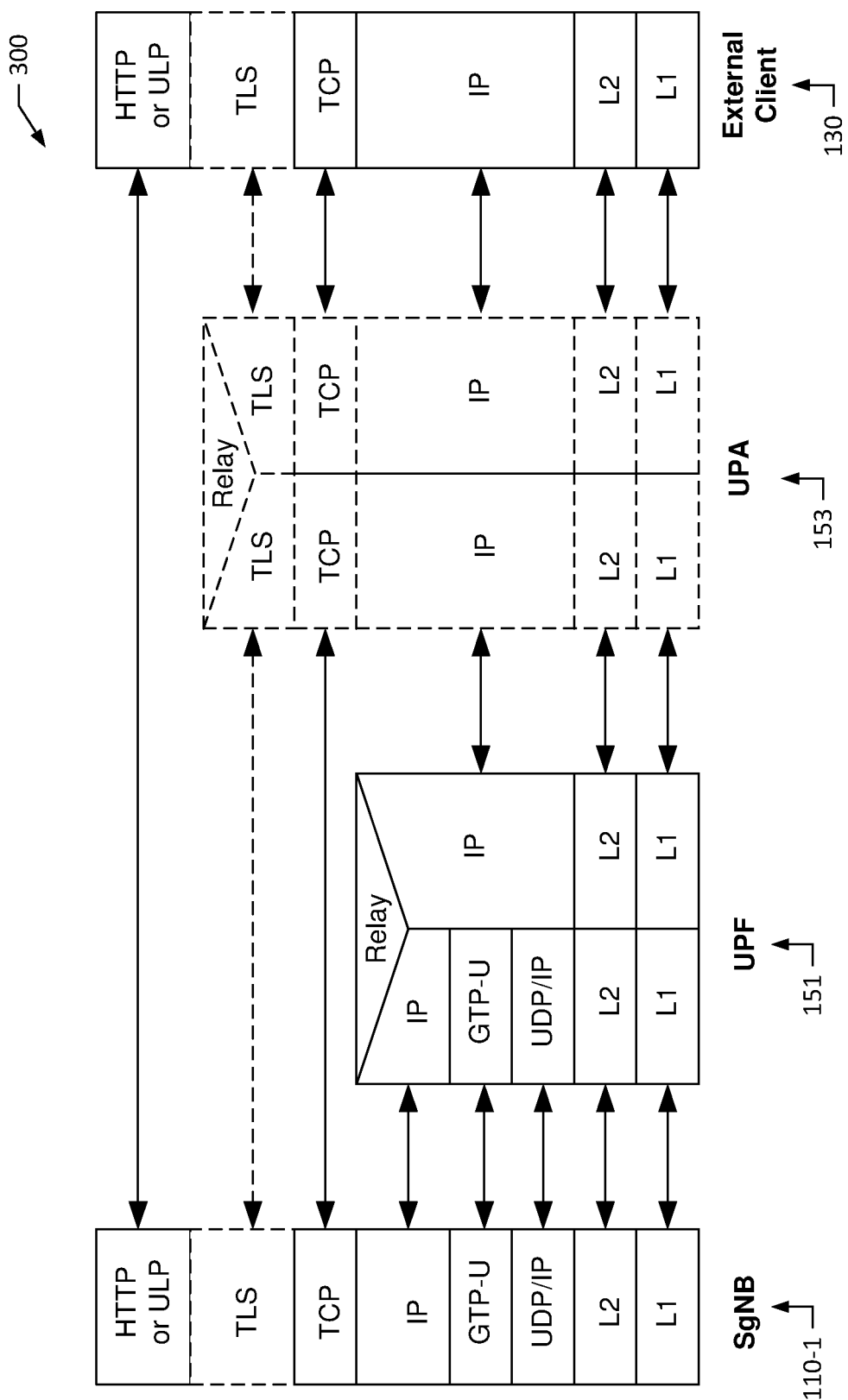
FIG. 3 is a representation of protocol layering which may be used when a base station in a Radio Access Network (RAN) transfers location reports for a target UE to an external client.

FIG. 3 shows protocol layering 300 which may be used when a SgNB 110-1 transfers location reports for the target UE 105 to the external client 130. Protocol layering between the SgNB 110-1 and UPF 151 corresponds to that defined for an N2 reference point between NG-RAN 112 and a 5GCN 150 (e.g. as defined in 3GPP TS 38.300 and TS 23.501) with the difference that the SgNB 110-1 also supports the Internet Protocol (IP) layer. When a UPA 153 is not present, protocol layering between the UPF 151 and external client 130 corresponds to that supported by a UPF 151 to any other external data entity. At the upper levels, the SgNB 110-1 and external client 130 support the Transmission Control Protocol (TCP), optionally Transport Layer Security (TLS) and either the HyperText Transfer Protocol (HTTP) (e.g. HTTP/2) or the UserPlane Location Protocol (ULP) defined by the Open Mobile Alliance for the Secure User Plane Location (SUPL) solution. When a UPA 153 is present, the UPA 153 intercepts the IP, TCP and (when present) TLS layers and relays HTTP or ULP messages between the SgNB 110-1 and external client 130. An advantage of ULP may be existing support in ULP for transferring location information for a target UE 105 (e.g. a location estimate) and support of authentication and ciphering using TLS. An advantage of HTTP may be low implementation impact and widespread support by external clients 130.

The protocol layering shown in FIG. 3 allows the SgNB 110-1 to transfer HTTP or ULP messages containing location reports for the target UE 105 to the external client 130. TLS may be used to enable mutual authentication and support ciphering. TCP is used to provide reliable transfer. Since a gNB 110 may already support the GPRS Tunneling Protocol for user plane access (GTP-U), User Datagram Protocol with IP (UDP/IP) and Layers 1 and 2 (L1 and L2) towards the UPF 151, the new impacts are to add IP, TCP, optionally TLS and either HTTP or ULP. If a UPA 153 is present inside the 5GCN 150, TLS support may not be needed by the SgNB 110-1.

In some alternative implementations, HTTP or ULP in FIG. 3 could be replaced by a different protocol such as Simple Mail Transfer Protocol (SMTP) or Simple Object Access Protocol (SOAP), and IP could be replaced by or be augmented with a Local Area Network (LAN) protocol if the external client 130 is accessed via a LAN.

There may be one TCP connection and one optional corresponding TLS session between the SgNB 110-1 and the external client 130 or UPA 153 for each target UE being located. Alternatively, one TCP connection and an optional corresponding TLS session may be shared among multiple UEs by being used to support location reporting for some or all target UEs for which location reports need to be sent by an SgNB 110-1 to an external client 130 or UPA 153. Location reports sent at the HTTP or ULP (or other equivalent) protocol level may include an identity or reference for the target UE 105 (e.g. a Generic Public Subscription Identifier (GPSI), a Subscription Permanent Identifier (SUPI)), an identity or address for the external client 130 (e.g. when location reports are sent via a UPA 153), a location session reference or identifier and location related information being reported.

Information, referred to here as "location context information", may be needed in participating entities (e.g. UE 105 and gNBs 110) to support transmission of UL and DL RS s, obtain UL and DL location measurements, transfer location measurements to an SgNB 110-1, and/or to deliver location reports to an external client 130.

For location reporting for one target UE 105 using an SgNB 110-1, Table 1 summarizes location context information which may be stored in each type of entity and events which may create, update or delete this information.

TABLE 1

| Entity | Stored Location Context Information | Creation, Update, Deletion |
|---|---|---|
| SgNB | Information from an original location request for the target UE Identities and/or addresses of participating RPs, TPs, NgNBs, target UE and external client Security information for an external client (e.g. cipher key(s)) Location session reference Location session identifier UL location measurements configured by the SgNB in each RP DL RS transmission configured by the SgNB in each TP DL location measurements and UL RS transmission configured by the SgNB in the target UE Recently determined UE location information Recently received UL and/or DL location measurements Statistics on location reporting (e.g. current duration and number of location reports sent so far) | Created after receiving a location request for the target UE (e.g. from an AMF or previous SgNB) Updated after configuring location measurements in RPs or the target UE, configuring UL or DL RS in TPs or the target UE, or after receiving responses from RPs, TPs or the target UE Deleted after handover or cell change of the target UE with change of SgNB |

TABLE 1-continued

| Entity | Stored Location Context Information | Creation, Update, Deletion |
|---|---|---|
| RP | Identity or address of the SgNB<br>Location session identifier<br>UL location measurements configured by the SgNB<br>Identity of the target UE if needed for the UL location measurements | Created after configuration of UL location measurements in the RP by the SgNB<br>Updated after reconfiguration of UL location measurements in the RP by the SgNB or by a new SgNB |
| TP | Location session identifier<br>DL RS transmission configured by the SgNB | Created after configuration of DL RS transmission in the TP by the SgNB<br>Updated after reconfiguration of DL RS transmission in the TP by the SgNB or by a new SgNB |
| Target UE | Location session identifier<br>DL location measurements configured by the SgNB<br>UL RS transmission configured by the SgNB<br>Parameters (e.g. protocol layer, use of ciphering, maximum message size, periodicity) for location measurement reporting to the SgNB using L1 or L2 | Created after configuration of DL location measurements and/or UL RS transmission in the target UE by the SgNB<br>Updated after reconfiguration of DL location measurements and/or UL RS transmission in the target UE by the SgNB or by a new SgNB |

A location session identifier (e.g. as shown in Table 1) may be used to identify a location request for a target UE 105 and an associated location session which is used by an SgNB 110-1 to support the location request. The location session identifier may also be used to associate signaling messages and location measurements with the location session. In the case of UL location measurements, RPs may send UL location measurements to the SgNB 110-2 and may include the location session identifier in each message used to convey the UL location measurements to allow the SgNB 110-1 to associate each message with the location session. In the case of DL location measurements, the target UE 105 may send DL location measurements to the SgNB 110-1 and may include the location session identifier in each message used to convey the DL location measurements message (e.g. as sent at a PHY, RLC, PDCP or RRC layer as described for FIG. 2).

Figure 4:
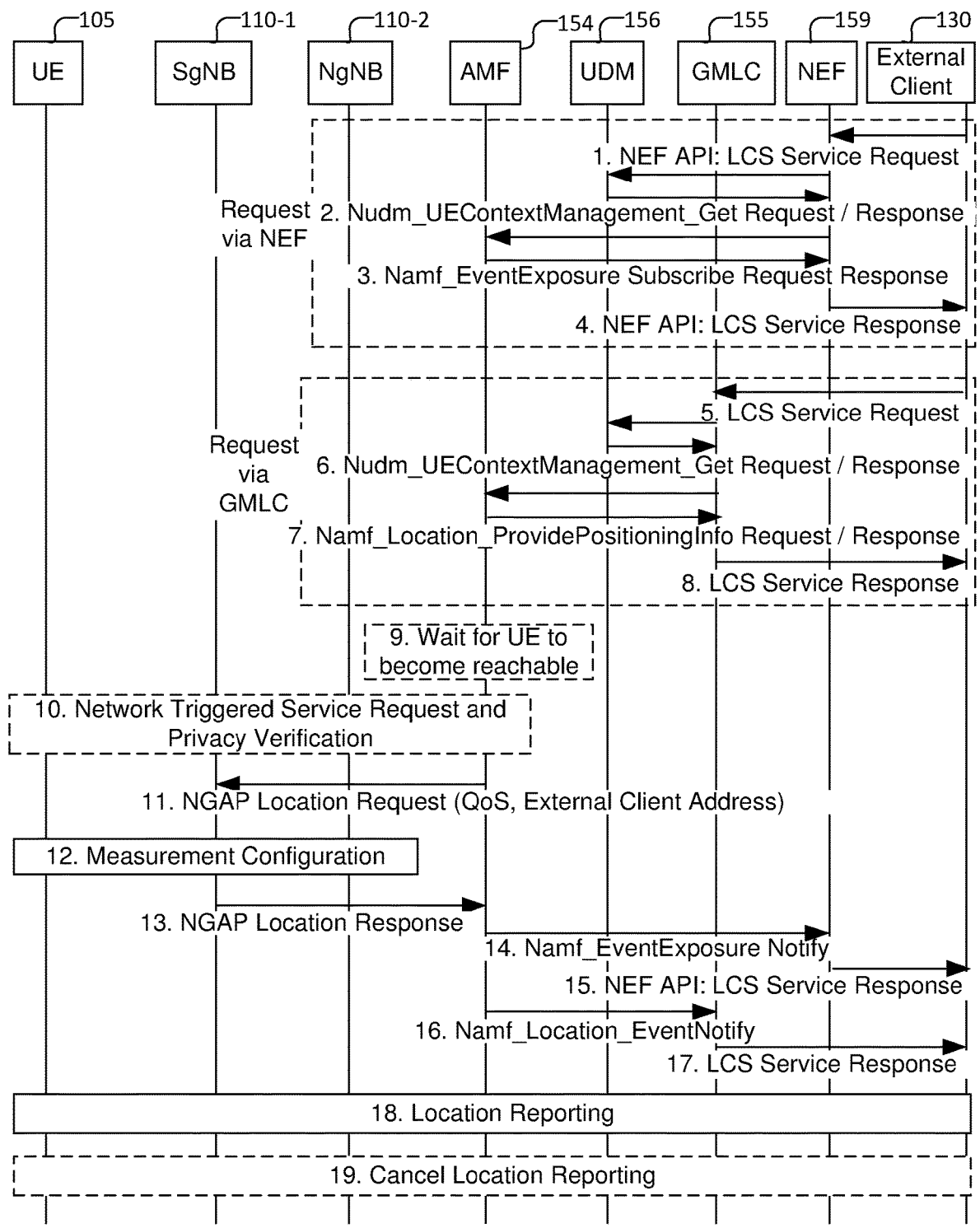
FIG. 4 shows a location session establishment and reporting procedure to support an SLLLS that is applicable for a location server function in a serving base station.

FIG. 4 shows a location session establishment and reporting procedure to support an SLLLS that is applicable to use of a SgNB 110-1. The procedure shows in detail how location reporting via user plane signaling can be requested by an external client 130 and configured in participating entities. The procedure applies to a non-roaming target UE 105 as in communication system 100 FIG. 1.

As illustrated in FIG. 4, the external client 130 may send a location request for the target UE 105 to either an NEF 159 or a GMLC 155 in the 5GCN 150. For a request via an NEF 159, stages 1-4 are performed and stages 5-8 are omitted. For a request via a GMLC 155, stages 1-4 are omitted and stages 5-8 are performed. For a request via an NEF 159, a location request sent to the NEF 159 at stage 1 may include: (i) an identity of the target UE 105 (e.g. a GPSI or SUPI); (ii) criteria for sending back location reports at stage 18 (e.g. location report trigger events such as an area event trigger or a UE motion trigger or parameters for periodic sending of location reports); (iii) Quality of Service (QoS) parameters such as a required location accuracy, location reporting latency and location reporting reliability; (iv) a minimum and/or a maximum location reporting interval; (v) criteria for starting and stopping location reporting (e.g. a start time, stop time, maximum number of reports, maximum duration of reporting); (vi) location reporting content (e.g. supported Geographic Area Description (GAD) shapes and whether UE velocity and/or UE orientation should be reported); (vii) an identification of the external client 130 (e.g. a client name, Fully Qualified Domain Name (FQDN) or IP address); and/or (viii) a location session reference (e.g. a number or an alphanumeric sequence) to be used later to identify location reports at stage 18. The location request at stage 1 may also include a request to send location reports (e.g. at stage 18) via a user plane and an address to which location reports should be sent via the user plane (e.g. an IP address, Uniform Resource Identifier (URI) or FQDN) and security information. The security information may include a ciphering and/or authentication key (or keys) and an identification for the external client 130 which may be usable to establish a TLS session between an SgNB 110-1 and the external client 130 as described later. The security information may not be present or may be ignored by the NEF 159 when location reporting at stage 18 uses a UPA 153. As part of stage 1, the NEF 159 may authenticate the external client 130 and verify the external client 130 is authorized to locate the target UE 105. For example, the NEF 159 may verify privacy requirements for the target UE 105 (e.g. by requesting privacy requirements for the target UE 105 stored in the UDM 156) and that the privacy requirements allow the target UE 105 to be located by the external client 130.

At stage 2 in FIG. 4, if the NEF 159 is not aware of the serving AMF 154 for the target UE 105, the NEF 159 may query a UDM 156 for the address of the serving AMF 154 by invoking an Nudm_UEContextManagement_Get service operation. The UDM 156 then returns the serving AMF address.

At stage 3, the NEF 159 forwards the location request received at stage 1 to the serving AMF 154 for the target UE 105 by invoking an Namf_EventExposure Subscribe service operation. The forwarded location request may contain some or all of the information that was included in stage 1. The serving AMF 154 may return a response to the NEF 159 confirming acceptance of the location request.

It is noted that in a variant of the procedure, the NEF 159 may send the location request to the serving AMF 154 via the UDM 156 (not shown in FIG. 4), in which case stage 2 is not performed.

At stage 4, the NEF 159 may return a first response to the external client 130 confirming that the location request sent in stage 1 was accepted by the network.

It is noted that in a variant of the procedure (not shown in FIG. 4), the NEF 159 may forward the location request to the GMLC 155 after stage 1, in which case the GMLC 155 may perform stages 6 and 7 and return a location response to the NEF 159. In this variant, stages 2 and 3 are not performed.

At stage 5 in FIG. 4, for a request via a GMLC, the location request may include the same information or similar information to that described in stage 1 for a location request via an NEF 159. As part of stage 5, the GMLC 155 may authenticate the external client 130 and verify the external client 130 is authorized to locate the target UE 105 (e.g. as described for the NEF 159 in stage 1).

At stage 6, if the GMLC 155 is not aware of the serving AMF 154 for the target UE 105, the GMLC 155 may query a UDM 156 for the address of the serving AMF 154 by invoking a Nudm_UEContextManagement_Get service operation. The UDM 156 then returns the serving AMF 154 address.

At stage 7, the GMLC 155 forwards the location request received at stage 5 to the serving AMF 154 for the target UE by invoking an Namf_Location_ProvidePositioningInfo service operation. The forwarded location request may contain some or all of the information that was included in stage 5. The serving AMF 154 may return a response to the GMLC 155 confirming acceptance of the location request.

At stage 8, the GMLC 155 may return a first response to the external client 130 confirming that the location request sent in stage 5 was accepted by the network.

At stage 9 in FIG. 4 (which applies to a location request sent via either an NEF 159 or GMLC 155), the serving AMF 154 waits for the target UE 105 to become reachable (e.g. if the target UE 105 is not initially reachable due to use of discontinuous reception (DRX) or power saving mode (PSM)).

At stage 10, if the target UE 105 is not in a CM connected state (e.g. does not have an SgNB 110-1), the serving AMF 154 performs a network triggered service request to place the target UE 105 in CM connected state. Once the UE 105 is in CM connected state, the serving AMF 154 may verify target UE 105 privacy by sending a message to the target UE 105 (e.g. a supplementary services message) indicating the requested location of the target UE 105 and possibly identifying the external client 130. The target UE 105 (e.g. after notifying and obtaining a response from a user for the target UE 105) may return a response to the serving AMF 154 indicating whether or not the location request is allowed. If the location request is not allowed, the serving AMF 154 may return a response to the external client 130 as at stages 14-17 indicating that the location request was not accepted by the target UE 105 and the rest of the procedure may be omitted.

At stage 11, the serving AMF 154 determines to use a location service capability in the NG-RAN 112 rather than an LMF 152. This determination may be configured in the serving AMF 154 for all target UEs (e.g. if the 5GCN 150 does not contain an LMF 152) or may be based on the type of location request received at stage 3 or stage 7 (e.g. may be based on a location request that includes a QoS specifying very low latency, such as a latency of less than one second and/or a location request which specifies location reporting via a user plane). The serving AMF 154 then sends an NGAP location request message (e.g. an NGAP Location Reporting Control (LRC) message) to the SgNB 110-1 for the target UE 105. The NGAP location request message may be sent using control plane signaling. The NGAP location request message may include "location request information" that comprises some or all of the information in the location request received by the serving AMF 154 at stage 3 or stage 7. In some implementations, the NGAP location request message may be, or may act as, a transport message and may include a message for a higher protocol level (e.g. a message for an LMF service based operation) which includes the location request information. The SgNB 110-1 may store some or all of the location request information which may form part of the location context for the target UE 105 in the SgNB 110-1 as described in Table 1.

At stage 12, the SgNB 110-1 configures location measurements for the target UE 105 to support the location request which was received at stage 11. The measurement configuration at stage 12 is described in more detail in FIG. 5.

At stage 13, the SgNB 110-1 returns an NGAP location response (e.g. an NGAP Location Report message or a transport message carrying a location response at a higher protocol level) to the serving AMF 154 confirming that the location request for the target UE 105 has been activated. In some embodiments, stage 13 may occur before stage 12.

At stage 14, for a request from an NEF 159 (e.g. where stages 1-4 were performed or where an NEF 159 sent a location request to the serving AMF 154 via the UDM 156), the serving AMF 154 invokes an Namf_EventExposure Notify service operation to send an indication to the NEF 159 that the location request at stage 1 has been activated.

At stage 15, the NEF 159 forwards the indication received at stage 14 to the external client 130.

At stage 16, for a request from a GMLC 155 (e.g. where stage 7 was performed), the serving AMF 154 invokes an Namf_Location_EventNotify service operation to send an indication to the GMLC 155 that the location request at stage 5 (or stage 1 if an NEF 159 forwards a location request to the GMLC 155) has been activated.

At stage 17, the GMLC 155 forwards the indication received at stage 16 to the external client 130.

Figure 6:
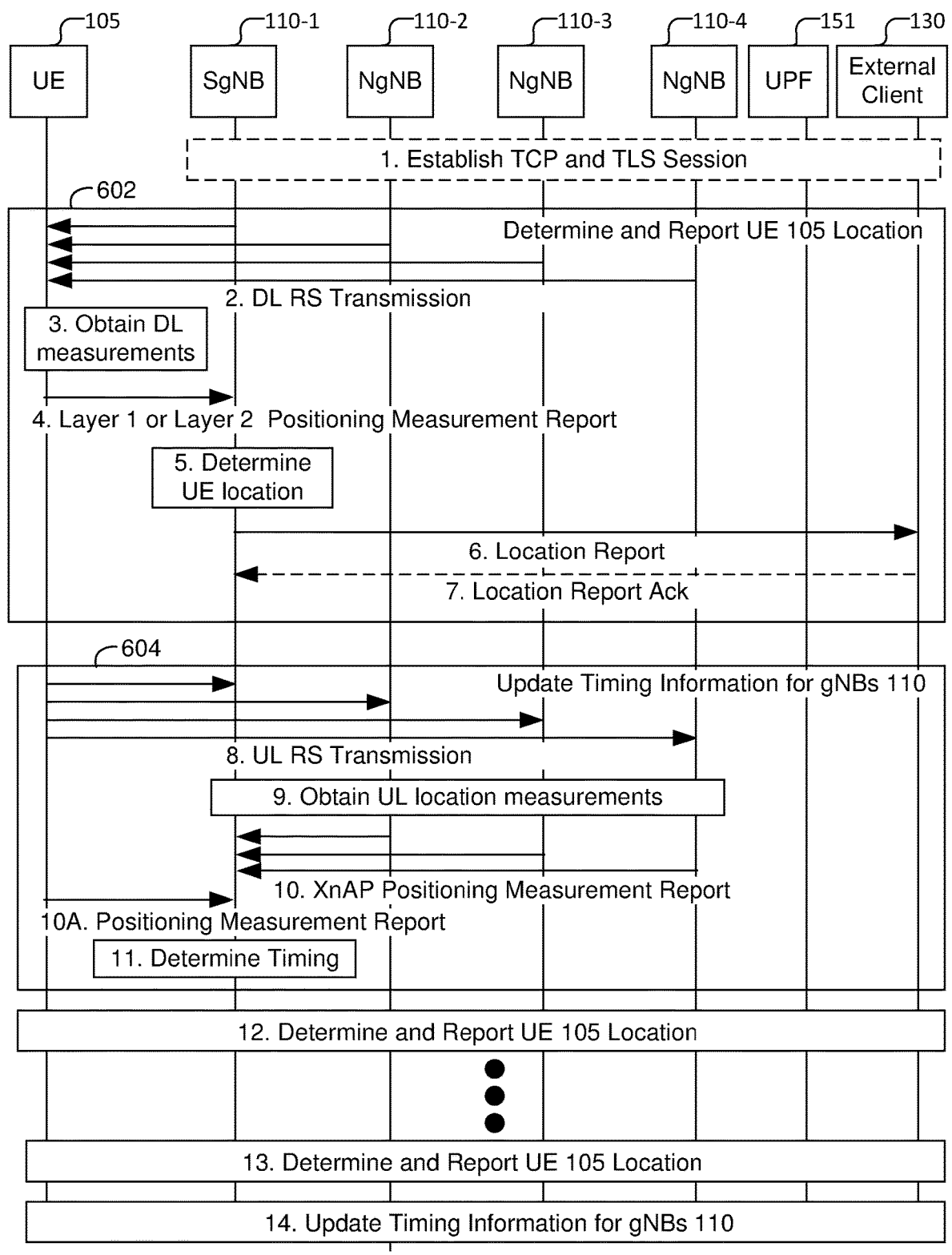
FIG. 6 shows a procedure to support location reporting by a serving base station to support an SLLLS.

At stage 18, the SgNB 110-1 performs location reporting for the target UE 105 via a user plane as described in more detail in FIG. 6.

At stage 19, the target UE 105, SgNB 110-1, GMLC 155, NEF 159 or external client 130 may cancel the location request by sending a location cancelation request directly or indirectly to other entities participating in the location reporting. The other entities participating in the location reporting may include whichever of the target UE 105, SgNB 110-1, GMLC 155, NEF 159 and external client 130 are not instigating the location cancelation and participated in at least one of stages 1-18.

Figure 5:
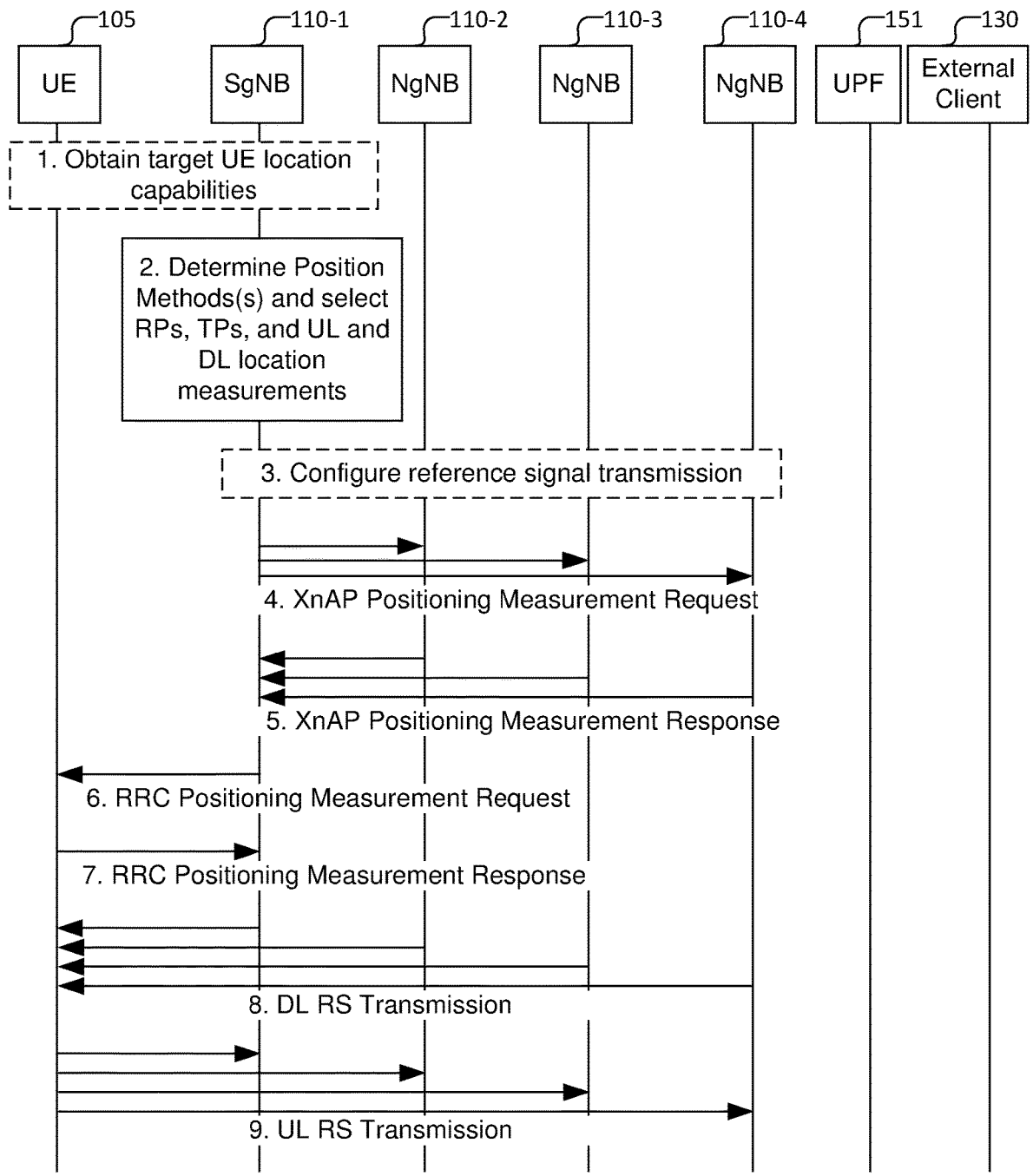
FIG. 5 shows a procedure to support location measurement configuration by a location server function in a serving base station to support an SLLLS.

FIG. 5 shows a procedure to support location measurement configuration by a SgNB 110-1 to support a SLLLS. The procedure may be used to support stage 12 in FIG. 4. The procedure applies to a non-roaming target UE 105 as in FIG. 1.

At stage 1 in FIG. 5, the SgNB 110-1 may obtain the location capabilities of the target UE 105 by sending an RRC request message to the UE 105 and receiving an RRC response message from the UE 105 containing the location capabilities. In some embodiments, the RRC request message and the RRC response message may each include an LPP message containing a request for the capabilities and the location capabilities, respectively. In one embodiment, the RRC request message may include an embedded LPP request message (e.g. an LPP Request Capabilities) and the RRC response message may include an embedded LPP response message (e.g. an LPP Provide Capabilities), where the LPP response message includes the location capabilities of the UE 105. The location capabilities received from the UE 105, for example, may indicate a capability to send location information at a Layer 1 (L1) or Layer 2 (L2) protocol level and a capability to support OTDOA and multi-RTT.

At stage 2, the SgNB 110-1 determines a position method or position methods for obtaining location estimates and other location information for the target UE 105. The position methods may include, for example, multi-RTT, OTDOA and use of inertial sensors. The position methods may be determined based on the UE 105 location capabilities obtained at stage 1 and/or the requested QoS for the location request for the target UE 105 (e.g. as received at stage 11 in FIG. 4). For example, the determined position method(s) may comprise only position methods indicated as supported by the target UE 105 and which can support or help support the requested QoS. The SgNB 110-1 may also select one or more reception points (RPs) to obtain UL location measurements for the target UE 105 to support the determined position method(s). The RPs may include the SgNB 110-1 and one or more NgNBs 110-2, 110-3, 110-4. The SgNB 110-1 may also determine one or more UL location measurements to be obtained by each RP and criteria for obtaining the UL location measurements. The UL location measurements may be determined based on the determined position method(s), the location QoS, and/or the location capabilities of the selected measurement entities (e.g. as configured in the SgNB 110-1). For example, the UL location measurements may include one or more of a TOA, Rx-Tx, AOA, RSSI, RSRP, RSRQ. Typically, the criteria for obtaining the UL location measurements will be to obtain measurements at fixed periodic intervals. The SgNB 110-1 may also determine one or more DL location measurements to be obtained by the target UE 105 and criteria for obtaining the DL location measurements. The DL location measurements may be determined based on the determined position method(s), the location QoS, and/or the location capabilities of the target UE 105 as obtained at stage 1. For example, the DL location measurements may include one or more of an Rx-Tx, AOA, RSSI, RSRP, RSRQ, RSTD. Criteria for obtaining the DL location measurements may be to obtain measurements at fixed periodic intervals. However, as described previously, DL measurements of RSTD may be obtained by UE 105 at lower (i.e. shorter) periodic intervals than UL measurements obtained by gNBs 110 and at lower periodic intervals than DL Rx-TX measurements obtained by UE 105. The SgNB 110-1 may further determine a cipher key to be used to cipher location information provided by the UE 105 at an L1 or L2 protocol level.

In one embodiment, SgNB 110-1 may determine, as part of stage 2, "additional measurements" to be obtained by UE 105, which may be reported by UE 105 along with the DL location measurements. As an example, the additional measurements may comprise or include sensor measurements (e.g. measurements of UE 105 change of location, velocity, change of velocity and/or acceleration). The additional measurements may be useful to enable SgNB 110-1 to determine a location of UE 105 when UE 105 is moving while obtaining the DL location measurements. For example, the additional measurements may enable SgNB 110-1 to determine the relative location of UE 105 at which each DL location measurement was obtained by UE 105, which may help avoid errors caused by assuming that the DL location measurements all correspond to a single location of UE 105. This may enable location of UE 105 by SgNB 110-1 with higher reliability and accuracy.

At stage 3, which is optional, the SgNB 110-1 may select one or more transmission points (TPs) comprising gNBs 110 (e.g. other NgNBs 110-2, 110-3, 110-4 and the SgNB 110-1) or TPs within gNBs 110 to transmit DL reference signals (RSs) to be later measured by the target UE 105 to support some or all of the DL location measurements determined at stage 2. The reference signals may include positioning reference signals (PRSs), tracking reference signals (TRSs) and other types of RS and may include omnidirectional RSs and/or directional (e.g. beamformed) RSs. The SgNB 110-1 may then send an XnAP message to each selected TP which is not part of the SgNB 110-1 to configure transmission of a DL RS by each selected TP. In some embodiments, the XnAP message which is sent to each selected TP at stage 3 may include an NRPPa message containing information to configure transmission of a DL RS by this selected TP. The transmission times for the configured RSs may be timed to coincide with required or selected location reports for the target UE 105. For example, if the external client 130 requests periodic location reporting for the target UE 105 at 200 millisecond (ms) intervals at stage 1 or stage 5 in FIG. 4, the SgNB 110-1 may configure each TP to transmit a DL RS for a short period (e.g. 1 ms) at least once prior to each 200 ms reporting interval. Since the target UE 105 may need to measure a DL RS from each of many TPs (e.g. 10-20 TPs) prior to each periodic location report by UE 105 in order to ensure accurate location determination for UE 105, SgNB 110-1 may employ "time separation" of the DL RSs by configuring each TP to transmit a DL RS at a different time to some or all of the other TPs. This may enable UE 105 to measure just one DL RS at any particular time, and avoid UE 105 measuring two or more DL RSs simultaneously, which may be difficult or impossible for some UEs.

In one embodiment, "time separation" of the DL RSs may be achieved by assigning a common set of RS transmission (or positioning) occasions to all TPs, during each of which only some TPs (e.g. one TP or a few TPs) transmit a DL RS while the remaining TPs mute DL RS transmission (by transmitting no DL signal in the frequency range assigned for DL RS transmission) to reduce interference to TPs that are transmitting a DL RS. Interference to DL RSs may also be reduced by employing "frequency separation" in which different DL RSs are transmitted in different nonoverlapping frequency ranges, or "code separation" in which different DL RSs are encoded according to different (e.g. orthogonal.) code sequences at a bit, chip, symbol or other physical level. In situations where the selected TPs are already transmitting RSs to support location of other UEs, the SgNB 110-1 may modify the transmission by requesting increased transmission of RSs (e.g. using a higher bandwidth and/or a higher frequency of transmission) and/or by requesting improved time separation, improved code separation and/or improved frequency separation of DL RSs. The configuration of TPs may be supported by sending an XnAP message (possibly including an NRRPa message) from the SgNB 110-1 to each selected TP (except the SgNB 110-1) indicating the required DL RS transmission. The configuration information sent to each TP may include RS details (e.g. RF carrier frequency, bandwidth, periodicity of transmission, assigned transmission or positioning occasions, muting occasions, coding sequences, durations of DL RS transmission) and a start and end time. Each TP may return a response (e.g. an XnAP and/or NRPPa response) to the SgNB 110-1 confirming whether or not the requested DL RS configuration can be performed.

At stage 4, which is optional, if RPs are selected at stage 2 which include or are part of other gNBs 110 or LMUs, the SgNB 110-1 sends an XnAP request message (e.g. XnAP Positioning Measurement Request) to each RP requesting UL location measurements of signals to be transmitted by the target UE 105. Each request may indicate the type of signal(s) to be later transmitted by the target UE 105 (e.g. whether this is an UL PRS, UL SRS or other type of UL RS) and may include characteristics of the signal(s) such as RF carrier frequency, bandwidth, coding and timing of transmission. Each request may also indicate the requested types of UL location measurement and may indicate QoS for the measurements (e.g. accuracy, latency in obtaining the measurements, reliability). Each request may also indicate a series of measurement occasions at each of which the UL location measurements are to be obtained. The measurement occasions may be periodic in which case the SgNB 110-1 may provide a periodicity and a start time and end time. As described previously, the UL location measurements requested at stage 4 may include Rx-Tx or TOA measurements to be obtained by RPs at fixed periodic intervals. In some embodiments, the XnAP Positioning Measurement Request message which is sent to each RP at stage 4 may be an XnAP transport message that includes an NRPPa message containing some or all of the information to configure the UL location measurements by this RP.

At stage 5, if stage 4 occurs, each RP which receives a request as part of stage 4 sends an XnAP response message (e.g. an XnAP Positioning Measurement Response or an XnAP transport message containing an NRPPa message) to the SgNB 110-1 indicating whether the UL location measurements requested at stage 4 can be supported. In some variants, the messages (e.g. XnAP and/or NRPPa messages) for stages 4 and 5 may be combined with the messages used to support stage 3.

At stage 6, the SgNB 110-1 sends an RRC request message (e.g. an RRC Positioning Measurement Request) to the target UE 105 to request UL transmission by the target UE 105 of an UL RS (e.g. an UL PRS or UL SRS) to support the UL location measurements selected at stage 2 and/or to request DL location measurements by the target UE 105 of DL signals received from the SgNB 110-1 and NgNB 110-2, 110-3, and 110-4 selected at stage 2 (and possibly to request additional location measurements as described for stage 2). The RRC request may include details of the DL signals to be measured by UE 105. The RRC request may request that the UE 105 send location information (e.g. DL location measurements and additional location measurements) to the SgNB 110-1 at an L1 or L2 protocol level, e.g., if the UE 105 indicated a location capability to do so at stage 1. The RRC request may further include a cipher key, e.g., as determined at stage 2, to be used by the UE 105 to cipher location information that is to be provided to the SgNB 110-1. The RRC request may further include details about the required UL RS (e.g. RF coding, bandwidth, RF carrier frequency, periodicity and timing of transmission, and/or a start time and end time for transmission). The request may further indicate QoS for the DL location measurements (e.g. accuracy, latency in obtaining the measurements, reliability) and a series of measurement occasions at each of which the DL location measurements are to be obtained by the target UE 105. The measurement occasions may be defined by criteria such as a fixed periodic interval, trigger conditions such as movement of the target UE 105 by more than some threshold distance and/or by a start time and end time. As described previously, the DL location measurements requested at stage 4 may include RSTD measurements to be obtained by UE 105 at fixed periodic intervals that are lower (i.e. shorter) than the fixed periodic intervals at which RPs are requested to obtain UL location measurements at stage 4. The DL location measurements requested at stage 4 may also include Rx-Tx measurements to be obtained by UE 105 at fixed periodic intervals that are the same as the fixed periodic intervals at which RPs are requested to obtain UL location measurements at stage 4.

The SgNB 110-1 may send multiple measurement requests to UE 105 at stage 6, e.g., a first request for first location measurements and a second request for second location measurements, where the first location measurements are to be sent by the UE 105 at an L1 or L2 protocol level at first periodic intervals, and the second location measurements are to be sent by UE 105 at second periodic intervals, where the first periodic intervals are shorter (i.e. smaller) than the second periodic intervals. The request for the second location measurements may indicate that the second location measurements are to be sent by the UE 105 at a Radio Resource Control (RRC) protocol level or at an L1 or L2 protocol level. The first location measurements requested may be, e.g., Reference Signal Time Difference (RSTD) measurements and the second location measurements requested may be, e.g., Receive Time-Transmission Time (Rx-Tx) measurements. A request to UE 105 to transmit uplink (UL) signals, may indicate that the UL signals are to be transmitted by UE 105 at third periodic intervals, where the first periodic intervals are shorter than the third periodic intervals. The first request, the second request and the request to transmit UL signals may be sent by SgNB 110-1 and received by UE 105 in respective first, second and third messages for a Radio Resource Control (RRC) protocol or LPP transported by RRC, or may be sent and received in the same RRC or LPP message.

In some embodiments, the RRC request or requests which is (or are) sent to the target UE 105 at stage 6 may each be an RRC transport message that includes an LPP message (e.g. an LPP Request Location Information and/or an LPP Provide Assistance Data) containing some or all of the information to configure the UL RS transmission and/or the DL location measurements (e.g. including use of an L1 or L2 protocol level for location measurement reporting) by the target UE 105.

At stage 7, the target UE 105 returns an RRC and/or LPP response to the SgNB 110-1 confirming whether the requested UL RS transmission and/or DL location measurements can be supported by the target UE 105.

At stage 8, each of the TPs selected and configured at stage 3 transmits a DL RS (e.g. at periodic intervals), as requested at stage 3, which may be received and measured by the target UE 105. The transmission of a DL RS by each TP may continue for a location reporting period for the target UE 105 or until transmission of a DL RS is canceled or reconfigured by the SgNB 110-1 or by another SgNB 110-1 if the target UE 105 moves to a new SgNB 110-1.

At stage 9, if the SgNB 110-1 configures transmission of an UL RS by the target UE 105 at stage 6, the target UE 105 commences to transmit the configured UL RS, as requested at stage 6, and may continue for a location reporting period for the target UE 105 or until transmission of the UL RS is canceled or reconfigured by the SgNB 110-1 or by another SgNB 110-1 if the target UE 105 moves to a new SgNB 110-1. The UL signals may be Positioning Reference Signals, Sounding Reference Signals, or both. The UL signals transmitted by the UE 105, may be transmitted at periodic intervals that may be longer than the periodic intervals at which the UE 105 measures DL signals from the gNBs 110, e.g., using Reference Signal Time Difference (RSTD) measurements. The transmitted UL signals enable location measurement of the UE 105 by the RPs (e.g. gNBs), including the SgNB 110-1 and NgNBs 110-2, 110-3, and 110-4.

FIG. 6 shows a procedure to support location reporting by a SgNB 110-1 to support an SLLLS. The procedure may be used to support stage 18 in FIG. 4. The procedure applies to a non-roaming target UE 105 as in FIG. 1.

At stage 1 in FIG. 6, if there is currently no TCP connection and optional TLS session between the SgNB 110-1 and the external client 130 or UPA 153 (when a UPA 153 is used) which can be used to send location reports for the target UE 105, the SgNB 110-1 establishes a TCP connection and optional TLS session with the external client 130 or UPA 153 (if used). This may occur any time after stage 13 in FIG. 4. For location reporting directly to the external client 130, the SgNB 110-1 may use an address or identity of the external client 130 received at stage 11 in FIG. 4 to establish the TCP connection, and any ciphering and authentication key(s) received at stage 11 of FIG. 4 to establish a TLS session. For location reporting via a UPA 153, the SgNB 110-1 may use an address for the UPA 153 and, optionally, a ciphering and authentication key (or keys) to establish a TCP connection and an optional TLS session with the UPA 153 (not shown in FIG. 6). For example, the address for the UPA 153 and any ciphering and authentication key(s) may be configured in SgNB 110-1 or provided at stage 11 in FIG. 4. The UPA 153, if used, may already have a TCP connection and optional TLS session with the external client 130 but, if not, may establish a TCP connection and optional TLS session with the external client 130 as part of stage 1 after a TCP connection and TLS session have been established with the SgNB 110-1 or after receiving the first location report from the SgNB 110-1 at stage 6.

In a variant of stage 1, when SUPL ULP is used to send location reports rather than HTTP, the SgNB 110-1 may establish a SUPL session with the external client 130 or UPA 153 if there is currently no SUPL session, which may include establishing a TCP connection and optional TLS session as described above. In this variant, SgNB 110-1 may indicate (e.g. at a ULP level and optionally in a SUPL START or SUPL TRIGGERED START message sent to the external client 130 or UPA 153 as part of stage 1) that the SUPL session is associated with the location request sent at stage 1 or stage 5 in FIG. 4. For example, SgNB 110-1 may include a location session reference sent by external client 130 at stage 1 or stage 5 in FIG. 4 in a SUPL START or SUPL TRIGGERED START message sent to external client 130 or UPA 153 as part of stage 1 in FIG. 6.

At block 602 in FIG. 6, a location for UE 105 is determined by SgNB 110-1 and reported to external client 130. Block 602 comprises stages 2-7. At stage 2 for block 602, SgNB 110-1, NgNBs 110-2 to 110-4 and other TPs selected and configured at stage 3 in FIG. 5 transmit a DL RS which may be received by the target UE 105 as described for stage 8 of FIG. 5. The transmission of a DL RS by each TP may continue for a location reporting period for the target UE 105 or until transmission of a DL RS is canceled or reconfigured by the SgNB 110-1 or by another SgNB 110-1 if the target UE 105 moves to a new SgNB 110-1.

At stage 3, if the target UE 105 was previously requested by the SgNB 110-1 to obtain DL location measurements (and possibly additional location measurements) as at stage 6 in FIG. 5, the target UE 105 obtains the requested DL location measurements (and additional location measurements). The DL location measurements, for example, may be Reference Signal Time Difference (RSTD) measurements, RSRP measurements and/or Receive Time-Transmission Time (Rx-Tx) measurements. The additional location measurements may be measurements obtained from inertial sensors of UE 105.

At stage 4, if stage 3 occurs, and if the UE is an RRC Connected state, the target UE 105 sends a Layer 1 or Layer 2 Positioning Measurement Report message to the SgNB 110-1 and includes the DL location measurements (and additional location measurements such as sensor measurements) obtained at stage 3. As discussed for FIG. 2, the Layer 1 (L1) or Layer 2 (L2) protocol level may be one of: (i) a Physical (PHY) layer; (ii) a Media Access Control (MAC) layer which may be supported by a PHY layer; (iii) a Radio Link Control (RLC) layer which may be supported by PHY and MAC layers and; or (iv) a Packet Data Convergence Protocol (PDCP) layer which may be supported by PHY, MAC and RLC layers. The DL location measurements, for example, may be Reference Signal Time Difference (RSTD) measurements, RSRP measurements and/or Receive Time-Transmission Time (Rx-Tx) measurements. The UE 105 may cipher the DL location measurements (and additional location measurements) using a cipher key, e.g., provided by the SgNB 110-1 at stage 6 in FIG. 5, prior to sending the Positioning Measurement Report to the SgNB 110-1, e.g. if the DL location measurements are sent at the PHY, MAC or RLC layer.

In one embodiment, if UE 105 is in an RRC Inactive state, UE 105 may instead send an RRC Positioning Measurement Report message to SgNB 110-1 or another gNB 110 at stage 4, as described for FIG. 2 as a "message 3" without entering an RRC Connected state. The RRC Positioning Measurement Report message may be an RRC transport message that includes an embedded LPP message containing the DL location measurements obtained by the target UE 105 for a measurement occasion. In this embodiment, a gNB 110 which receives the RRC Positioning Measurement Report message and is not the SgNB 110-1 may forward the RRC message or the embedded LPP message to SgNB 110-1 using XnAP.

In another embodiment, UE 105 may send the DL location measurements (and additional location measurements) obtained at stage 3 to the SgNB 110-1 at stage 4 in an RRC message when in an RRC Connected state, where sending of the RRC message may be supported by the PHY, MAC, RLC and/or PDCP protocol layers. Although this embodiment may be less efficient than use of L1 or L2, it may require less implementation impact to the UE 105 and SgNB 110-1.

At stage 5, the SgNB 110-1 determines a location for the target UE 105 based on the DL location measurements (and additional location measurements) received in stage 4 and according to the position method(s) selected at stage 2 in FIG. 5. The location determination at stage 5 may also be based on timing information obtained or determined by SgNB 110-1 for the SgNB 110-1, the NgNBs 110-2 to 110-4 and other TPs as described further down for block 604. For example, the DL location measurements may comprise RSTD measurements, the timing information may comprise RTDs and the SgNB 110-1 may determine the UE 105 location at stage 5 using OTDOA. Alternatively, or in addition, the DL location measurements may include RSRP measurements of directional beamformed RSs transmitted at stage 2, and the SgNB 110-1 may determine the UE 105 location at stage 5, at least in part, using AOD. The SgNB 110-1 may also determine other location information for the target UE 105 such as a velocity and/or orientation based on the DL location measurements (and additional location measurements).

At stage 6, based on criteria for reporting the location of the target UE 105 received at stage 11 in FIG. 4, the SgNB 110-1 determines whether to report the location information obtained at stage 5 to the external client 130. If the SgNB 110-1 determines to report the location information, the SgNB 110-1 sends a location report to the external client 130 or to a UPA 153 if a UPA 153 is used (not shown in FIG. 6). The location report may include some or all of the location information determined at stage 5 as well as a target UE 105 identity (e.g. GPSI or SUPI), a location session reference, and/or an address or indication of the external client 130. The location report may be sent as a user plane message according to the protocol layering described for FIG. 3. For example, the user plane signaling may be based on at least one of the Internet Protocol (IP), the Transmission Control Protocol (TCP), Transport Layer Security (TLS), or some combination of these. When the location report is sent to a UPA 153, the UPA 153 may forward the location report to the external client 130 using a separate TCP connection and optional TLS session as described for FIG. 3. If HTTP is used to send the location report at stage 6, the location report may comprise an HTTP POST message. If ULP is used to send the location report at stage 6, the location report may comprise a ULP message such as a SUPL POS message, SUPL POS INIT message or a SUPL REPORT message.

At stage 7, optionally, the external client 130 may return an acknowledgment to the SgNB 110-1 and via a UPA 153 if a UPA 153 is used. An acknowledgment may not be needed if an acknowledgement at the TCP level is considered to be sufficient. In some variants, an acknowledgment at stage 7 or a separate message from the external client 130 to the SgNB 110-1 may request some change to the location reporting such as a higher or lower periodicity of location reporting or a higher or lower location QoS or cancellation of location reporting. If HTTP is used to send the location report at stage 6, the acknowledgement at stage 7 may comprise an HTTP Status 204 (no content) message or HTTP Status 200 OK message.

At block 604 in FIG. 6, timing information for SgNB 110-1, NgNBs 110-2 to 110-4 and other TPs is determined by SgNB 110-1 and used to update previous timing information. For example, the timing information may comprise RTDs between pairs of gNBs 110. Block 604 comprises stages 8-11. At stage 8 for block 604, the target UE 105 transmits the configured UL RS which is received by one or more of the SgNB 110-1, NgNBs 110-2, 110-3, 110-4, and other RPs (not shown in FIG. 6) as described for stage 9 of FIG. 5.

At stage 9 in FIG. 6, if one or more of the SgNB 110-1, NgNBs 110-2, 110-3, 110-4, and other RPs were selected (and configured) to obtain UL location measurements at stage 4 in FIG. 5, the SgNB 110-1, NgNBs 110-2, 110-3, 110-4 and other RPs obtain UL location measurements of the UL RS transmitted by the target UE 105 at stage 8. For example, the UL location measurements may comprise Rx-Tx and/or TOA measurements.

At stage 10, if stage 9 occurs, each of the NgNBs 110-2, 110-3, 110-4 and other RPs which obtained UL location measurements at stage 9 sends an XnAP message (e.g. an XnAP Positioning Measurement Report) to the SgNB 110-1 and includes the UL location measurements obtained at stage 9. In some embodiments, the XnAP Positioning Measurement Report message which is sent to the SgNB 110-1 at stage 10 may be an XnAP transport message that includes an NRPPa message containing the UL location measurements obtained for a measurement occasion.

At stage 10A, if stage 3 occurs, the target UE 105 obtains DL location measurements of DL signals transmitted by SgNB 110-1, NgNBs 110 and other TPs and sends these to the SgNB 110-1 (e.g. in an RRC message or at a Layer 1 or Layer 2). In contrast to the DL location measurements sent at stage 4, the DL location measurements sent at stage 10A may be used only to help SgNB 110-1 obtain timing information for gNBs 110 and other RPs. The DL location measurements obtained and sent at stage 10A may be Receive Time-Transmission Time (Rx-Tx) measurements. In some embodiments, stage 10A may include or comprise stages 3 and 4. In one example of this, second DL location measurements (e.g. Rx-Tx measurements) to enable timing information to be obtained by SgNB 110-1 may need to be sent at stage 10A at intervals of 5 seconds, and first DL location measurements (e.g. RSTD measurements) and additional measurements to enable a location of UE 105 to be obtained by SgNB 110-1 may need to be sent at intervals of 200 ms. In this example, UE 105 may obtain and send the first DL location measurements and additional location measurements in a Layer 1 or Layer 2 Positioning Measurement Report (or an RRC message) every 200 ms according to stages 3 and 4 and may obtain and include the second DL location measurements in the Layer 1 or Layer 2 Positioning Measurement Report (or the RRC message) every 5 seconds according to stages 3 and 4.

At stage 11, the SgNB 110-1 may determine timing information for the SgNB 110-1 and each of the NgNBs 110 and other RPs, based, at least in part, on the DL location measurements received from the UE at stage 4, the DL location measurements received at stage 10A, and the UL measurements received at stage 10. For example, the DL location measurements obtained from the UE 105 at stage 4 may be (or may include) Reference Signal Time Difference (RSTD) measurements, the DL location measurements obtained from the UE 105 at stage 10A may be (or may include) Rx-Tx measurements, and the UL location measurements obtained from the SgNB 110-1, NgNBs 110 and other RPs may be (or may include) Time of Arrival (TOA) measurements or Rx-Tx measurements or both. The timing information determined at stage 11 for each NgNB 110 and RP (or TP) may be Real Time Differences (RTDs) between pairs of NgNBs 110 and/or pairs of RPs. The determined or updated timing information may be used to help determine the location of UE 105—e.g. as at stage 5.

Determination and reporting of the UE 105 location as at block 602 may be repeated periodically at first periodic intervals at stages 12, 13 and other stages not shown in FIG. 6. Determination and/or updating of timing information for SgNB 110-1 and other gNBs 110, as at block 604, may be repeated periodically at second periodic intervals at stage 14 and other stages not shown in FIG. 6. Because, the timing information for the SgNB 110-1 and other gNBs 110 and RPs (e.g. RTDs between pairs of gNBs 110 and/or RPs) may be stable and change by only very small values (e.g. 10 nanoseconds (ms) or less) over a periodic of a few seconds, the second periodic intervals may each be several seconds in duration (e.g. 1-10 seconds) or longer. In contrast, if the UE 105 is potentially moving and needs to be tracked with high location precision (e.g. 30 centimeters error or less) with low latency (e.g. 50-200 ms), the first periodic intervals may be much shorter than the second periodic intervals (e.g. may be 50-200 ms).

In some embodiments, the UE 105 may send positioning measurement reports for first DL location measurements to SgNB 110-1, e.g., RSTD measurements, at an L1 or L2 (or RRC) protocol level, as at stage 4 in FIG. 6, at first periodic intervals. The UE 105 may also send positioning measurement reports to SgNB 110-1 for second DL location measurements, e.g., Rx-Tx measurements, either at the same first periodic intervals (e.g. as part of stage 4 in FIG. 6) or at second periodic intervals as at stage 10A, where the first periodic intervals are shorter than the second periodic intervals. The positioning measurement reports for the second DL location measurements may be sent at an L1 or L2 protocol level as at stage 4 or stage 10A in FIG. 6 or may be sent by UE 105 to SgNB 110-1 at an Radio Resource Control (RRC) protocol level as at stage 4 or stage 10A.

In some implementations, the SgNB 110-1 may receive DL location measurements from each of a plurality of UEs, e.g., UEs other than or in addition to UE 105, of DL signals transmitted by two or more gNBs 110 or other TPs, including the SgNB 110-1. The DL location measurements may be received by SgNB 110-1 from each of the plurality of UEs in Layer 1 or Layer 2 (or RRC) message reports similar to or the same as that described for stage 4 in FIG. 6. The SgNB 110-1 may also receive UL location measurements for each of the plurality of UEs from each of one or more gNBs 110 or other RPs, including the SgNB 110-1. The UL location measurements may be received by SgNB 110-1 from each of the gNBs 110 or other RPs in XnAP messages similar to or the same as those described for stage 10 in FIG. 6. As an example, the SgNB 110-1 may receive a location request for each of the plurality of UEs that was initiated by an external client (e.g. external client 130 or another external client) as described in FIG. 4, may initiate DL and UL location measurements for each of the plurality of UEs as described in FIG. 5, and may perform location reporting for each of the plurality of UEs as described in FIG. 6. The DL location measurements and the UL location measurements for each of the plurality of UEs may be similar to or the same as those described above for UE 105. In that case, the SgNB 110-1 may determine common timing information for the SgNB 110-1 and other gNBs 110 based on the UL and DL location measurements received for each of the plurality of UEs as at stage 11 in FIG. 6. Because the timing information (e.g. RTDs between pairs of gNBs 110 and/or other TPs) may not depend significantly on which UE the UL and DL location measurements are provided for, the frequency of UL location measurements by gNBs 110 and frequency of transmission of UL RS signals by each UE may be reduced in comparison to the frequency of obtaining a location for each UE, which may reduce network resource usage and resource usage by each UE in the plurality of UEs. In addition, by obtaining the timing information for the SgNB 110-1 and other gNBs 110 and/or TPs based on UL and DL location measurements for a plurality of UEs rather than just one UE 105, the SgNB 110-01 may be able to obtain more accurate timing information (e.g. more accurate RTDs) for the SgNB 110-1 and other gNBs 110 and/or TPs.

The determination of the UE 105 location at stage 5 in FIG. 6 and the determination of gNB 110 timing information at stage 11 in FIG. 6 may be based on the following observations. As is well known in the art, OTDOA location (as at stage 5) may be based on three quantities: Time Difference of Arrival (TDOA), Real Time Difference (RTD) and Geometric Time Difference (GTD). A TDOA can be the time interval that is observed by UE 105 between the reception of a DL RS from each of two different TPs and can correspond to an RSTD measurement. If a DL RS from a TP 1 is received by UE 105 at a time t1, and a corresponding DL RS from a TP 2 is received by UE 105 at a time t2, the TDOA value is (t2−t1) (or the negative of this). RTD can mean the relative synchronization difference in the network between two TPs. If the TP 1 sends a DL RS at a time t3, and the TP 2 sends a corresponding DL RS at a time t4, the RTD between them is (t4−t3). If the TPs transmit at exactly the same time, the TPs are synchronized and the RTD is zero. The GTD is the time difference between the reception of a DL RS from each of two different TPs due to geometry. If the length of a propagation path between the TP 1 and the UE 105 is d1, and the length of a propagation path between the TP 2 and the UE 105 is d2, then GTD is ((d2−d1)/c), where c is the speed of radio waves. The relationship between these three quantities is:

$$TDOA = RTD + GTD \quad (Eq\ 1)$$

GTD is the quantity that is useful for location purposes (e.g. using OTDOA), since it contains information about the position of UE 105. If only TDOA values are known (e.g. measured RSTDs), no location of UE 105 can typically be calculated with an asynchronous network, since RTD values must also be known. However, if RTD values are also available (e.g. as determined at stage 11 in FIG. 6), then the SgNB 110-1 may determine the location of UE 105 at stage 5 based on Equation 1 as applied to each of at least three pairs of TPs and typically more TPs (e.g. 10-20 pairs of TPs, where one TP in all pairs may be a common TP).

In synchronous networks, RTDs are usually zero (or close to zero). In asynchronous networks, the RTDs could be determined using TDOA (RSTD) and RTT measurements as at stage 11. If the RTT between UE 105 and each of the two TPs, TP 1 and TP 2, is measured, and the UE 105 measures in addition the TDOA (e.g. RSTD) between the two TPs, the RTD could be determined (e.g. at stage 11) as:

$$RTD = TDOA - GTD \quad (Eq\ 2)$$

Giving:

$$RTD = TDOA - (RTT2 - RTT1)/2 \quad (Eq\ 3)$$

Where RTT1 is the RTT between UE 105 and TP 1 and RTT2 is the RTT between UE 105 and TP 2.

The SgNB 110-1 may thus use Equation 3 at stage 11 to determine timing information in the form of RTDs for pairs of TPs (e.g. gNBs 110).

Note that, as is well known in the art, an RTT can be obtained as the sum of Rx-Tx measurements between a UE 105 and a gNB 110 or other combined TP/RP as follows:

$$RTT = Rx\text{-}Tx1 + Rx\text{-}Tx2 \quad (Eq\ 4)$$

To make use of Equation 4, a UE 105 may transmit an UL RS to the gNB 110 or TP/RP at UE time T1, which is later received by the gNB 110 or TP/RP at gNB 110 or TP/RP time T2. The gNB 110 or TP/RP may also transmit a DL RS to the UE 105 at gNB 110 or TP/RP time T3, which is later received by UE 105 at UE 105 time T4. The UE 105 then determines Rx-Tx1 to be (T4−T1) and the gNB 110 or TP/RP determines Rx-Tx2 to be (T2−T3). Equation 4 can then be applied to obtain the RTT between UE 105 and the gNB 110 or combined TP/RP.

Due to movement of the target UE 105 and/or other factors such a variations in wireless coverage or network loading level, the target UE 105 may change serving cell and, as a consequence, may be assigned a new SgNB.

Figure 7:
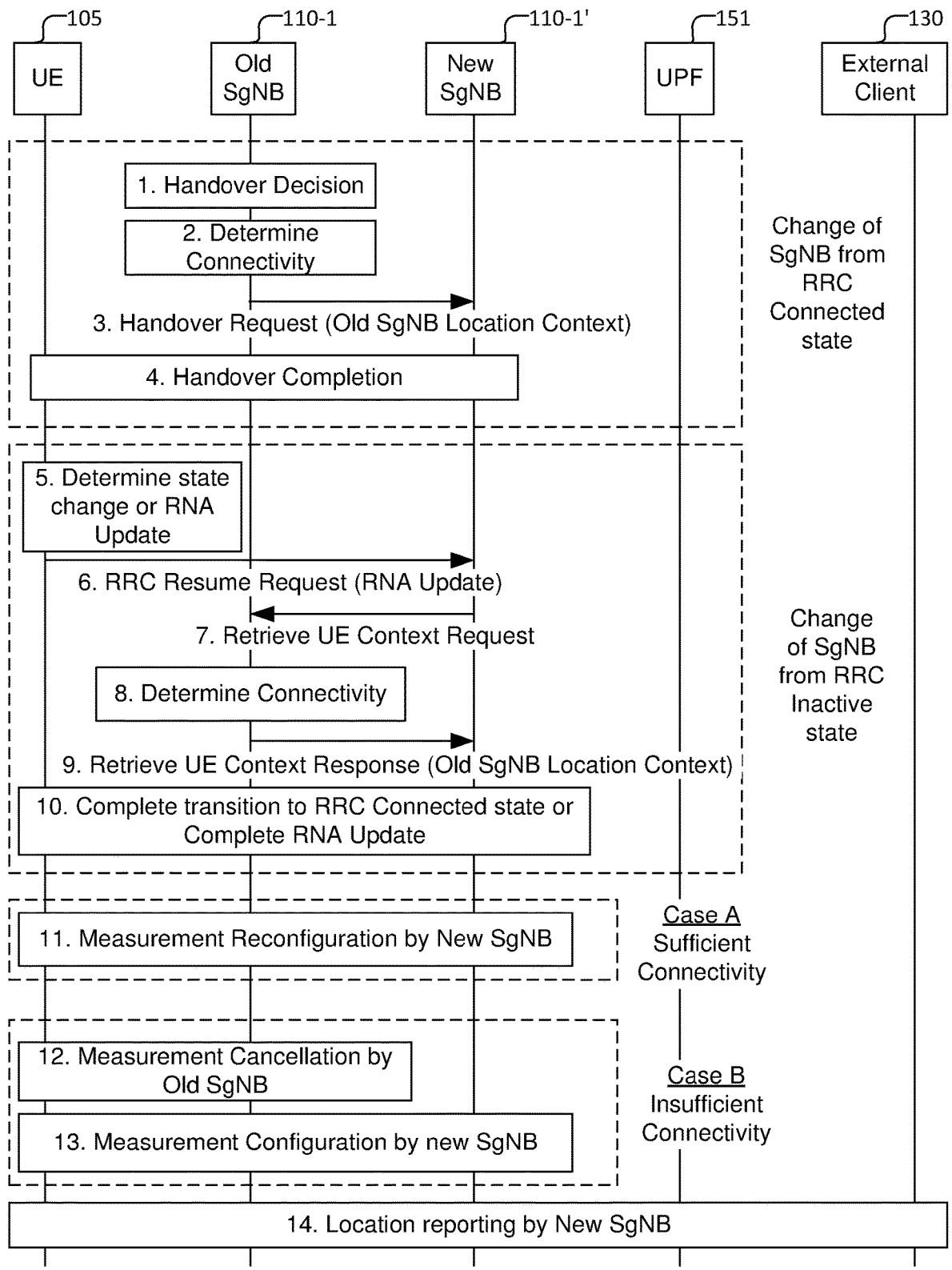
FIG. 7 shows a procedure to support change of a serving base station for a target UE in an RRC connected state or RRC Inactive state.

FIG. 7 shows a procedure to support change of SgNB for a target UE 105 in RRC connected state or RRC Inactive state. FIG. 7 also distinguishes two cases, referred to as Case A in which there is "Sufficient Connectivity" and Case B in which there is "Insufficient Connectivity." These are based on a determination performed by the current SgNB 110-1 (referred to below as the old SgNB 110-1) as to whether the new SgNB 110-1' does or does not have signaling connectivity to sufficient RPs and TPs currently, being used for UE 105 location reporting, to enable location reporting for the target UE 105 to continue at the new SgNB 110-1' after the handover or cell change and with support of the required QoS and using some or all of the same RPs and TPs. The result of this determination is either "sufficient connectivity" (referred to below as "Case A") or "insufficient connectivity" (referred to below as Case B).

Depending on the mobility of target UEs and the degree of network connectivity, it is possible that some PLMNs may only need to support one of Case A or Case B. For example, for location of objects in a factory, warehouse or single building, where all gNBs 110 providing wireless coverage are interconnected, only Case A may need to be supported.

At stage 1 in FIG. 7, if a change of SgNB occurs in RRC Connected state for the target UE 105, stages 1-4 are performed and stages 5-10 are omitted. If a change of SgNB occurs in RRC Inactive state for the target UE 105, stages 1-4 are omitted and stages 5-10 are performed. For RRC Connected state at stage 1, the old SgNB 110-1 determines that handover is needed for the target UE 105 and selects a new cell and/or new SgNB 110-1'.

At stage 2, the old SgNB 110-1 determines connectivity for the new cell and/or new SgNB 110-1' as described above. This is a binary decision where the result of the determination is either "sufficient connectivity" or "insufficient connectivity".

At stage 3, as part of a normal handover procedure (e.g. as described in 3GPP TS 38.300 and TS 23.502), the old SgNB 110-1 sends a Handover Request message to the new SgNB 110-1'. The Handover request message may be sent directly over the Xn interface (and possibly via one or more intermediate gNBs 110) or may be sent via an old serving AMF and a new serving AMF when change of AMF 154 occurs as part of the handover. The Handover Request message may be sent using control plane signaling. The old SgNB 110-1 includes the SgNB location context in the Handover Request (e.g. as described in Table 1) which may include (i) information for the location request initiated by the external client 130; (ii) an indication of the type of location information being received from the UE 105; (iii) an indication of UL location measurements for the UE 105 being obtained by the old SgNB 110-1; (iv) an indication of UL location measurements for the UE 105 being obtained by other gNBs 110 and/or other RPs and identities for the other gNBs 110 and/or other RPs; (v) an indication of DL reference signals (RS s) being transmitted by other gNBs 110 and/or other TPs and identities for the other gNBs 110 and/or other TPs; (vi) an indication of UL signals being transmitted by the UE 105; (vii) a location session identifier; (viii) an indication of the use of the L1 or L2 protocol layers for sending the location information by the UE; (ix) location capabilities of the UE; or (x) some combination of these. The old SgNB 110-1 may further include the result of the connectivity determination in stage 2.

At stage 4, the rest of the handover procedure occurs as described in 3GPP TS 38.300 and TS 23.502.

At stage 5, for RRC Inactive state, and as part of normal UE 105 operation not specifically associated with location reporting, the target UE 105 determines either to transition to RRC Connected state (e.g. in order to send and receive data or send DL location measurements as at stage 4 in FIG. 6) or to instigate a RAN-based Notification Area (RNA) update, e.g. due to changing RNA or for periodic RNA update.

At stage 6, the target UE 105 sends an RRC Resume Request message to a new SgNB 110-1' associated with a new cell for the target UE 105. The RRC Resume Request includes an indication of RNA Update when the UE 105 detected being in a new RNA at stage 5 and also includes an identification of the old SgNB 110-1.

At stage 7, the new SgNB 110-1' sends a Retrieve UE Context Request message to the old SgNB 110-1 if the old SgNB 110-1 is reachable from the new SgNB 110-1'. Stages 5-7 may be performed as defined in 3GPP TS 38.300 and TS 23.502 without any change for location reporting.

At stage 8, the old SgNB 110-1 determines connectivity for the new SgNB 110-1' as described for stage 2.

At stage 9, the old SgNB 110-1 returns a Retrieve UE Context Response message to the new SgNB 110-1' as described in 3GPP TS 38.300 to provide information for the target UE 105 to the new SgNB 110-1'. The old SgNB 110-1 also includes the old SgNB 110-1 location context in the Retrieve UE Context Response, similarly to that discussed in stage 3. The Retrieve UE Context Response message may be sent using control plane signaling. The old SgNB 110-1 may further include the result of the connectivity determination in stage 8.

At stage 10, the rest of the procedure for transition of the target UE 105 to RRC Connected state or completion of the RNA update occurs as described in 3GPP TS 38.300.

At stage 11, if Case A applies, the new SgNB 110-1' performs measurement reconfiguration for the target UE 105 based on the current configuration of UL and DL location measurements and UL and DL RS transmission as indicated in the location context received from the old SgNB 110-1. For example, the new SgNB 110-1' may optionally reconfigure UL location measurements by some gNBs 110 and RPs and/or may optionally reconfigure transmission of a DL RS by some gNBs 110 and TPs based on the new SgNB 110-1' address and/or new serving cell identity. Since a new SgNB 110-1' address and/or new serving cell identity can indicate some movement of the target UE 105, certain previous gNBs 110 and RPs (e.g. as selected at stage 2 in FIG. 5) may no longer be able to obtain accurate UL location measurements of UL signals transmitted by the target UE 105, and/or some previous gNBs 110 and TPs (e.g. as selected at stage 2 of FIG. 5) may no longer be able to effectively transmit a DL RS that can be accurately measured by the target UE 105. However, there may be other gNBs 110 and RPs, not selected by the old SgNB 110-1, that could obtain accurate UL location measurements of UL signals transmitted by the target UE 105. Similarly, there may be other gNBs 110 and TPs, not selected by the old SgNB 110-1, that could effectively transmit a DL RS that can be accurately measured by the target UE 105. The new SgNB 110-1' may thus determine: (i) a set of RPs, referred to here as "RP Set 1", for which ongoing UL location measurements will be cancelled; (ii) a set of RPs, referred to here as "RP Set 2", for which new UL location measurements will be requested; (iii) a set of TPs, referred to here as "TP Set 1", for which ongoing DL RS transmission will be cancelled; and/or (iv) a set of TPs, referred to here as "TP Set 2", for which new DL RS transmission will be requested. The new SgNB 110-1' may then perform the reconfiguration by performing a stage similar to stage 3 of FIG. 5 for the TPs in TP Set 1 and TP Set 2 and by performing stages similar to stages 4 and 5 of FIG. 5 for the RPs in RP Set 1 and RP Set 2, where, in the case of TP Set 1 and RP Set 1, XnAP messages requesting cancellation are sent by the old SgNB 110-1 instead of requests for new transmission or new measurements. After (or possibly before) the new SgNB 110-1' has reconfigured the TPs and RPs in TP and RP sets 1 and 2, the new SgNB 110-1' may perform stages similar to stages 6 and 7 of FIG. 5 to reconfigure DL location measurements and possibly UL RS transmission by the target UE 105. For example, the new SgNB 110-1' can request the target UE 105 to cease obtaining DL location measurements for DL RSs transmitted by the TPs in TP Set 1 and to instead start to obtain DL location measurements for DL RSs transmitted by TPs in TP Set 2. Following the reconfiguration, TPs in TP Set 1 may cease DL RS transmission for stage 8 of FIG. 5, TPs in TP Set 2 may start DL RS transmission as in stage 8 of FIG. 5 and the target UE 105 may modify UL RS transmission for stage 9 of FIG. 5 if the new SgNB 110-1' requested a change in target UE 105 UL RS transmission. In addition to adding and/or cancelling UL location measurements and/or DL RS transmission in some RPs and TPs, the new SgNB 110-1' also sends an XnAP Positioning Measurement Request to each previously selected RP for which UL location measurement is not changed informing the RP to now send XnAP Positioning Measurement Reports (as at stage 10 in FIG. 6) to the new SgNB 110-1' instead of to the old SgNB 110-1.

At stage 12, if Case B applies, based on "Insufficient Connectivity", the old SgNB 110-1 performs stages similar to stages 3-7 for FIG. 5 to cancel all UL location measurements, DL location measurements, UL RS transmission and DL RS transmission previously configured to support location reporting for the target UE 105 in selected RPs, TPs and target UE 105. The old SgNB 110-1 then deletes all location context information.

At stage 13, if case B applies, based on an indication of "Insufficient Connectivity" received at stage 3 or stage 9 or based on the new SgNB 110-1' making this determination, the new SgNB 110-1' configures entirely new location measurements for the target UE 105 to support the location request as indicated by the old SgNB 110-1 location context received at stage 3 or 9. The measurement configuration at stage 13 can be as described for FIG. 5.

At stage 14, for Case A and Case B, location reporting continues as described for FIG. 6 with the difference that location reporting is now performed by the new SgNB 110-1' according to the measurement configuration performed in stage 11 or 13.

Figure 8:
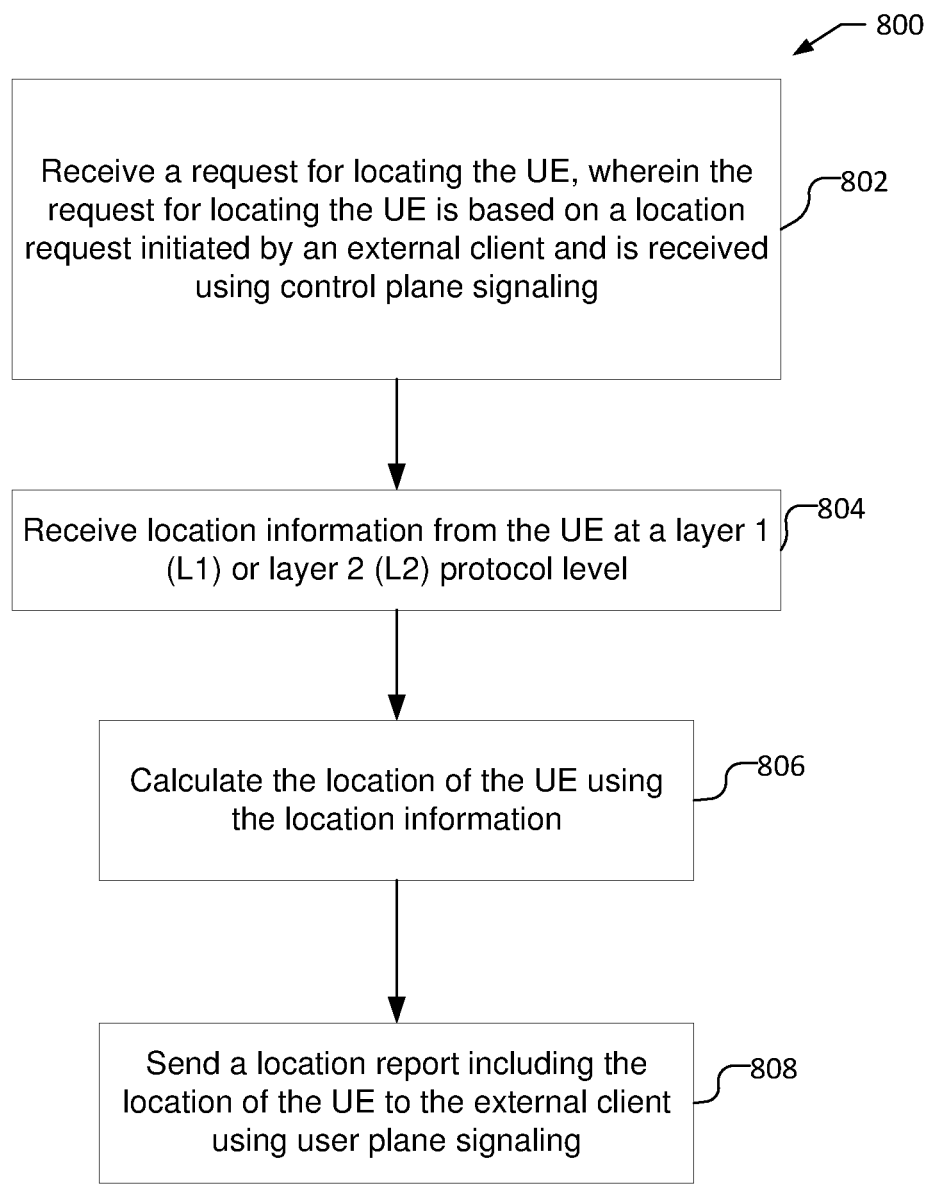
FIG. 8 shows a process flow illustrating a method for locating a user equipment (UE) performed by a location server function in a serving base in a wireless network.

FIG. 8 shows a process flow 800 illustrating a method for locating a user equipment (UE), such as the target UE 105, performed by a location server function located at (or attached to) a serving base station, such as the SgNB 110-1, for the UE in a Radio Access Network (RAN). The location server function, for example, may be performed by the serving base station or by an LMC server or LLMF server attached to the serving base station.

Process flow 800 may start at block 802, where a request for locating the UE is received, where the request for locating the UE is based on a location request initiated by an external client (e.g. the external client 130) and is received using control plane signaling, e.g., as described at stage 11 in FIG. 4 or stage 3 or 9 of FIG. 7. At block 804, the location server function receives location information from the UE at a layer 1 (L1) or layer 2 (L2) protocol level, e.g., as described at stage 4 in FIG. 6 and in FIG. 2. At block 806, the location server function calculates the location of the UE using the location information, e.g., as described at stage 5 in FIG. 6. At block 808, the location server function sends a location report including the location of the UE to the external client using user plane signaling, e.g., as described at stage 18 of FIG. 4, stage 6 of FIG. 6 and in FIG. 3.

In one implementation, the user plane signaling is based on at least one of the Internet Protocol (IP), the Transmission Control Protocol (TCP), Transport Layer Security (TLS), or some combination of these, e.g., as described for FIG. 3 and in stage 18 in FIG. 4, and stage 6 of FIG. 6.

In one implementation, the location report is sent to the external client using user plane signaling by sending a message for the Hypertext Transfer Protocol (HTTP) or the Secure User Plane Location (SUPL) UserPlane Location Protocol (ULP), e.g. as described for stage 6 of FIG. 6. The message for the HTTP may be an HTTP POST message and the message for the SUPL ULP may be a SUPL POS message, SUPL POS INIT message or SUPL REPORT message.

In one implementation, the L1 or L2 protocol level comprises one of: (i) a Physical layer; (ii) a Media Access Control (MAC) layer; (iii) a Radio Link Control (RLC) layer; or (iv) a Packet Data Convergence Protocol (PDCP) layer, or (v) some combination of these, e.g., as described at stage 4 in FIG. 6 and in FIG. 2.

In one implementation, the location information received from the UE comprises Reference Signal Time Difference (RSTD) measurements, sensor measurements or both RSTD and sensor measurements, as described at stage 4 in FIG. 6. In one implementation, calculating the location of the UE using the location information uses Observed Time Difference of Arrival (OTDOA), e.g., as described at stage 5 in FIG. 6.

In one implementation, the location server function may further receive first measurements from the UE of downlink (DL) signals transmitted by one or more first base stations in a plurality of base stations in the RAN, where the one or more first base stations include the serving base station, e.g., as described at stage 8 in FIG. 5, and stages 2, 4 and 10A in FIG. 6. The DL signals, for example, may be Positioning Reference Signals, Tracking Reference Signals, or both. The location server function may receive second measurements, from each of the plurality of base stations, of uplink (UL) signals transmitted by the UE, e.g., as described at stage 9 in FIG. 5, and stages 8-10 in FIG. 6. The UL signals, for example, may be Positioning Reference Signals, Sounding Reference Signals, or both. The location server function may determine timing information for the plurality of base stations based, at least in part, on the first measurements and the second measurements, e.g., as described at stage 11 in FIG. 6. The location server function may calculate the location of the UE using the location information and the timing information for the plurality of base stations, e.g., as described at stage 5 in FIG. 6. For example, in one implementation, the first measurements may comprise Receive Time-Transmission Time (Rx-Tx) measurements or Reference Signal Time Difference (RSTD) measurements or both, and the second measurements may comprise Time of Arrival (TOA) measurements or Rx-Tx measurements or both, wherein the timing information for the plurality of base stations comprises Real Time Differences (RTDs) between pairs of base stations in the plurality of base stations, e.g., as described for stage 11 in FIG. 6.

In one implementation, the location server function may send a request to the UE to send the first measurements, e.g., as described at stage 6 in FIG. 5, and may send a request to each of the plurality of base stations to send the second measurements, e.g., as described at stage 4 in FIG. 5.

In one implementation, the location information is received from the UE and the location report is sent to the external client at first periodic intervals, where the first measurements are received from the UE at second periodic intervals, where the second measurements are received from each base station in the plurality of base stations at third periodic intervals, where the first periodic intervals are shorter than the second periodic intervals and the third periodic intervals e.g., as described for FIG. 6.

In one implementation, the location server function receives third measurements, from a plurality of UEs, of DL signals transmitted by one or more second base stations in the plurality of base stations, where the one or more second base stations include the serving base station, e.g., as described for FIG. 6. The location server function receives fourth measurements from the plurality of base stations of UL signals transmitted by each of the plurality of UEs, e.g., as described for FIG. 6. The location server function may determine the timing information for each of the plurality of base stations based, at least in part, on the third measurements and the fourth measurements, e.g., as described for FIG. 6. The third measurements may be Receive Time- Transmission Time (Rx-Tx) measurements or Reference Signal Time Difference (RSTD) measurements or both, and the fourth measurements may be Time of Arrival (TOA) measurements or Rx-Tx measurements or both, and the timing information for each of the plurality of base stations may be Real Time Differences (RTDs) between pairs of base stations in the plurality of base stations.

In one implementation, the location server function may receive location capabilities for the UE from the UE, where the location capabilities indicate a capability to send the location information at the L1 or L2 protocol level, e.g., as discussed at stage 1 of FIG. 5. The location server function may send a request to the UE to send the location information at the L1 or L2 protocol level, e.g., as discussed at stage 6 of FIG. 5.

In one implementation, the location information is ciphered, e.g., as described at stage 4 of FIG. 6, and the location server function may determine a ciphering key; and send the ciphering key to the UE, where the location information is ciphered by the UE based on the ciphering key, e.g., as described at stage 2 and 6 of FIG. 5.

In one implementation, the RAN may be a next generation Radio Access Network (NG-RAN) (e.g. NG-RAN 112) providing 5G New Radio (NR) wireless access to the UE and the serving base station is a Serving NR Node B (SgNB) for the UE (e.g. SgNB 110-1). For example, the request for locating the UE may be received from an Access and Mobility Management Function (e.g. AMF 154) or a previous SgNB for the UE, e.g., as discussed at stage 11 in FIG. 4 or stages 3 or 9 of FIG. 7. In one implementation, for example, the location server function may identify a change of SgNB for the UE, where the change of SgNB is to a new SgNB, e.g., as discussed at stage 1 or stage 7 of FIG. 7, and may send a location context for the UE to the new SgNB, where the location context enables a continuation of location reporting for the UE by the new SgNB, e.g., as discussed at stage 3 or stage 9 of FIG. 7. Identifying the change of SgNB for the UE may be based on determining a handover for the UE to a serving cell for the new SgNB when the UE is in a connected state or on receiving a request for a UE context from the new SgNB when the UE is in an inactive state, e.g., as discussed at stage 1 or stage 7 of FIG. 7. The location context may comprise one of: (i) information for the location request initiated by the external client; (ii) an indication of the type of location information being received from the UE; (iii) an indication of UL location measurements for the UE being obtained by the SgNB; (iv) an indication of UL location measurements for the UE being obtained by other gNBs or RPs and identities for the other gNBs or RPs; (v) an indication of DL RSs being transmitted by other gNBs or TPs and identities for the other gNBs or TPs; (vi) an indication of UL signals being transmitted by the UE; (vii) a location session identifier; (viii) an indication of the use of the L1 or L2 protocol levels for sending the location information by the UE; (ix) location capabilities of the UE; or (x) some combination of these, e.g., as discussed at stage 3 and stage 9 of FIG. 7.

In one implementation, the location server function may receive a type of measurement from a plurality of neighboring NR Node Bs (e.g. NgNBs 110) in the RAN, where calculating the location of the UE, or calculating timing information for the plurality of NgNBs, is based in part on the type of measurement, e.g., as discussed for FIG. 6. The location server function may determine whether there is sufficient or insufficient signaling connectivity at the new SgNB to allow the new SgNB to receive the type of measurement from the plurality of NgNBs, e.g., as discussed at stages 2 and 8 in FIG. 7. The location server function may cancel the type of measurement in the plurality of NgNBs following the change of SgNB when insufficient signaling connectivity is determined, e.g., as discussed at stage 12 of FIG. 7. The location server function may refrain from cancelling the type of measurement in the plurality of NgNBs following the change of SgNB when sufficient signaling connectivity is determined, e.g., as discussed at stage 11 of FIG. 7. The location server function may send an indication of the determination of sufficient or insufficient signaling connectivity to the new SgNB, where the indication enables the new SgNB to configure at least some of the plurality of NgNBs to send the type of measurement to the new SgNB when sufficient signaling connectivity is indicated, where the indication enables the new SgNB to refrain from configuring the plurality of NgNBs when insufficient signaling connectivity is indicated, e.g., as discussed at stages 3 and 9 of FIG. 7.

Figure 9:
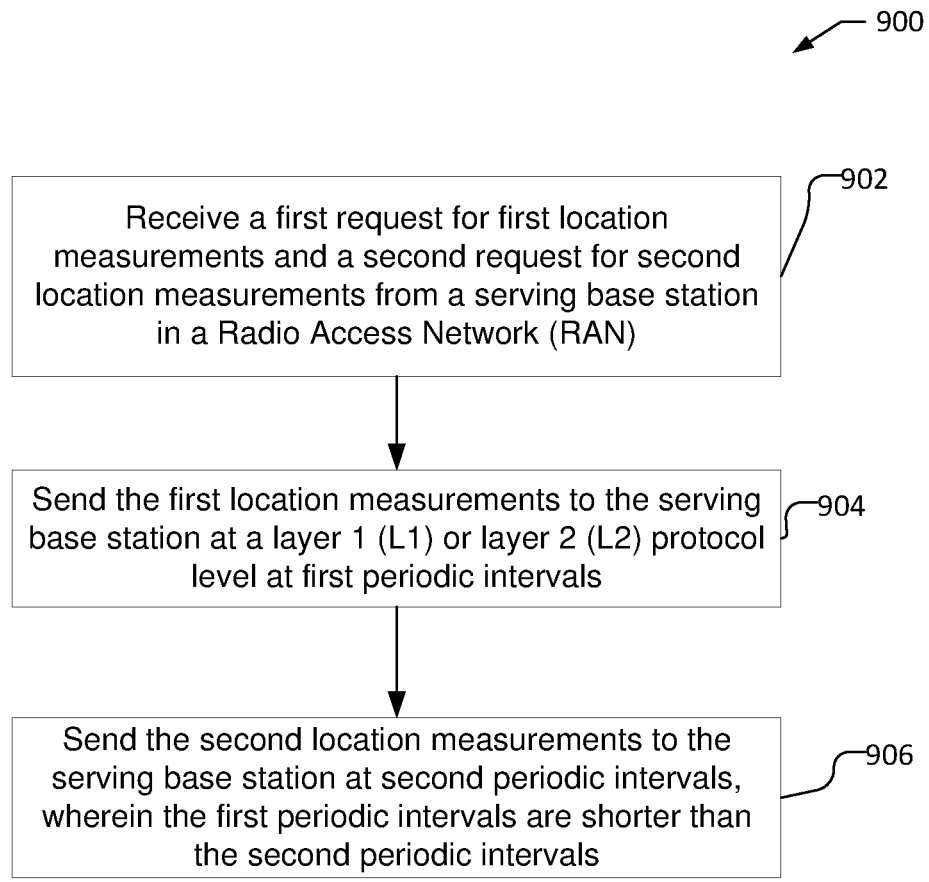
FIG. 9 shows a process flow illustrating a method for locating a user equipment (UE) performed by the UE.

FIG. 9 shows a process flow 900 illustrating a method for locating a user equipment (UE), such as the UE 105, performed by the UE.

Process flow 900 may start at block 902, where a first request for first location measurements and a second request for second location measurements is received from a serving base station in a Radio Access Network (RAN), e.g. as described for stage 6 in FIG. 5. At block 904, the UE sends the first location measurements to the serving base station at a layer 1 (L1) or layer 2 (L2) protocol level at first periodic intervals, e.g., as described for stage 4 in FIG. 6. At block 906, the UE sends the second location measurements to the serving base station at second periodic intervals, where the first periodic intervals are shorter than the second periodic intervals, e.g., as described for stage 10A in FIG. 6.

In one implementation, the L1 or L2 protocol level comprises one of: (i) a Physical layer; (ii) a Media Access Control (MAC) layer; (iii) a Radio Link Control (RLC) layer; (iv) a Packet Data Convergence Protocol (PDCP) layer; or (v) some combination of these, e.g., as described as described at stage 4 in FIG. 6 and in FIG. 2.

In one implementation, the first location measurements and the second location measurements comprise location measurements of downlink (DL) signals received from a plurality of base stations in the RAN, where the plurality of base stations includes the serving base station, e.g. as described at stage 8 of FIG. 5 and stages 2, 4 and 10A in FIG. 6. In one implementation, the first location measurements may be Reference Signal Time Difference (RSTD) measurements, sensor measurements or both RSTD and sensor measurements, as described at stage 4 in FIG. 6. The second location measurements may be Receive Time-Transmission Time (Rx-Tx) measurements, e.g. as described at stage 10A in FIG. 6. The DL signals, for example, may be Positioning Reference Signals, Tracking Reference Signals, or both.

In one implementation, the UE may receive a request for location capabilities of the UE from the serving base station, and may send the location capabilities of the UE to the serving base station, where the location capabilities indicate a capability to send the first location measurements at the L1 or L2 protocol level, e.g., as discussed at stage 1 of FIG. 5.

In one implementation, the first request for the first location measurements includes a ciphering key, e.g., as described at stage 2 and 6 of FIG. 5, and the UE may cipher the first location measurements using the ciphering key prior to sending the first location measurements to the serving base station at the L1 or L2 protocol level, e.g., as described at stage 4 of FIG. 6.

In one implementation, the RAN is a next generation Radio Access Network (e.g. NG-RAN 112) providing 5G New Radio (NR) wireless access to the UE and the serving base station is a Serving NR Node B (SgNB) for the UE (e.g. SgNB 110-1).

In one implementation, the second location measurements are sent to the serving base station at a Radio Resource Control (RRC) protocol level or at the L1 or L2 protocol level, e.g., as described for stage 10A of FIG. 6.

In one implementation, the UE may further receive a third request from the serving base station to transmit uplink (UL) signals, e.g., as described at stage 6 of FIG. 5. The UE may transmit the uplink (UL) signals at third periodic intervals, where the first periodic intervals are shorter than the third periodic intervals, where the UL signals enable location measurements of the UE by a plurality of base stations in the RAN, where the plurality of base stations includes the serving base station, e.g., as described at stage 9 of FIG. 5. The UL signals may be Positioning Reference Signals, Sounding Reference Signals, or both. The first request, the second request and the third request may be received in respective first, second and third messages for a Radio Resource Control (RRC) protocol, as described at stage 6 of FIG. 5. The first, second and third messages may be the same message.

Figure 10:
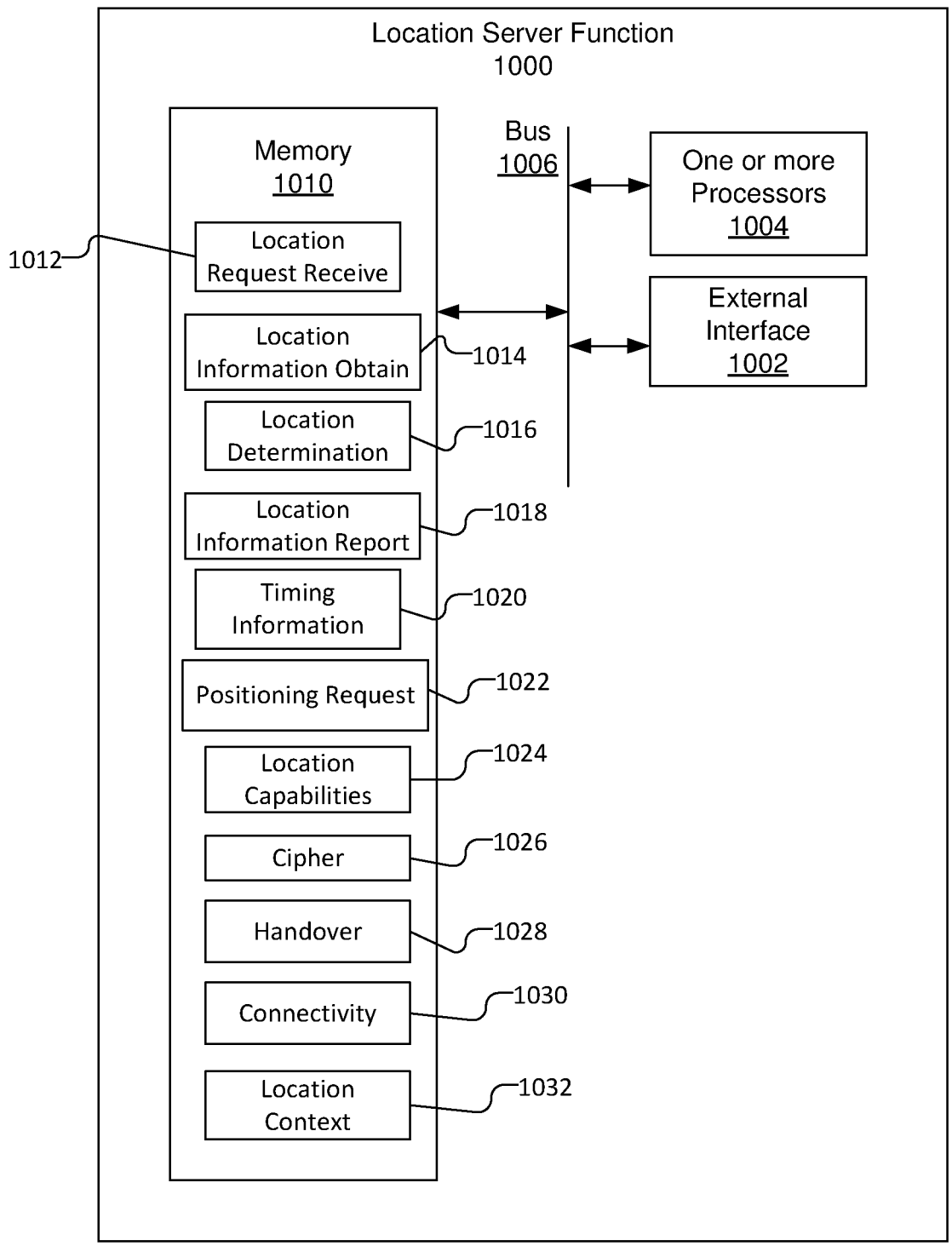
FIG. 10 is a block diagram of an embodiment of a location server function or serving base station that supports an SLLLS.

FIG. 10 is a diagram illustrating an example of a hardware implementation of a location server function 1000 that is located at or connected to a serving base station in a Radio Access Network, such as a Serving gNB (SgNB) 110-1, as discussed herein, and shown in FIGS. 1-8. The location server function 1000 may be performed by an entity at (or connected to) the serving base station (e.g. an LMC server or LLMF server) or performed by the serving base station, and may be, e.g., part of a wireless network such as a 5G System (5GS) and may be within an NG-RAN, such as NG-RAN 112 shown in FIG. 1. The location server function 1000 includes, e.g., hardware components such as an external interface 1002, which may be a wired or wireless interface capable of connecting to an AMF 154, a UPF 151, base stations within the RAN, such as neighbor NgNBs 110-2, 110-3, 110-4, as well as wirelessly connect to one or more UEs 105, and connect to a new location server function at a new serving base station during a handover. The location server function 1000 includes one or more processors 1004 and memory 1010, which may be coupled together with bus 1006. The memory 1010 may store data and may contain executable code or software instructions that when executed by the one or more processors 1004 cause the one or more processors 1004 to operate as a special purpose computer programmed to perform the procedures and techniques disclosed herein (e.g. such as the process flow 800).

As illustrated in FIG. 10, the memory 1010 includes one or more components or modules that when implemented by the one or more processors 1004 implement the methodologies described herein. While the components or modules are illustrated as software in memory 1010 that is executable by the one or more processors 1004, it should be understood that the components or modules may be dedicated hardware or firmware either in the processors 1004 or off processor. As illustrated, the memory 1010 may include a location request receive unit 1012 that enables the one or more processors 1004 to receive via the external interface 1002 a request for locating the UE from an entity in the wireless network, such as the AMF 154, or another SgNB 110-1 during a handover, wherein the request for locating the UE is based on a location request initiated by an external client (e.g. external client 130) and is received using control plane signaling.

The memory 1010 may further include a location information obtain unit 1014 that enables the one or more processors 1004 to receive via the external interface 1002 location information from the UE at a layer 1 (L1) or a layer 2 (L2) protocol layer, e.g., one or more of a Physical layer, a MAC layer, an RLC layer and a Packet Data Convergence Protocol (PDCP) layer. The location information from the UE may be, for example, RSTD measurement or Rx-Tx measurements or both. Additionally, location information may be obtained from the UE at the RRC protocol layer. The location information obtain unit 1014 may further enable the one or more processors 1004 to receive location information, via the external interface 1002, obtained from multiple UEs. The location information obtain unit 1014 may further enable the one or more processors 1004 to receive location information, via the external interface 1002, obtained from other base stations, e.g., NgNBs 110-2, 110-3, 110-4, which may be, e.g., TOA measurements or Rx-Tx measurements from UL signals transmitted by the UE 105 or from other UEs.

The memory 1010 may further include a location determination unit 1016 that enables the one or more processors 1004 to determine a location estimate of the UE using the received location information. For example, the location estimate may be determined using OTDOA based on received RSTD measurements.

The memory 1010 may further include a location information report unit 1018 that enables the one or more processors 1004 to send via the external interface 1002 a location report including the estimated location of the UE to the external client using user plane signaling, which may be based on at least one of the Internet Protocol (IP), the Transmission Control Protocol (TCP), Transport Layer Security (TLS), or some combination of these.

The memory 1010 may further include a timing information unit 1020 that enables the one or more processors 1004 to determine timing information for a plurality of base stations using measurements received from the UE 105 of DL signals transmitted by the base stations, e.g., Rx-Tx measurements or RSTD measurements or both, and measurements received from the base stations of UL signals transmitted by the UE 105, e.g., TOA measurements or Rx-Tx measurements or both. The timing information, for example, may be RTDs between pairs of base stations. The location determination unit 1016 may enable the one or more processors 1004 to determine the location estimate of the UE using the received location information and the timing information for the plurality of base stations. The timing information unit 1020 may further enable the one or more processors 1004 to determine the timing information for a plurality of base stations using measurements received from a plurality of UEs, that includes or is other than the UE 105, of DL signals transmitted by base stations, e.g., Rx-Tx measurements or RSTD measurements or both, and measurements received from the base stations of UL signals transmitted by the plurality of UEs, e.g., TOA measurements or Rx-Tx measurements or both.

The memory 1010 may further include a positioning request unit 1022 that enables the one or more processors 1004 to send a positioning measurement request to the UE. The positioning request unit 1022 may enable the one or more processors 1004 to request different types of location information, including RSTD measurements or Rx-Tx measurements of DL signals from base stations, and that the UE is to send one or more of the different types of location information at the L1 or L2 protocol level. The positioning request unit 1022 may further enable the one or more processors 1004 to send a positioning measurement request to base stations, e.g., NgNBs 110-2, 110-3, 110-4, e.g., to request measurements such as TOA measurements or Rx-Tx measurements of UL signals from the UE 105 and/or from a plurality of other UEs.

The memory 1010 may further include a location capabilities unit 1024 that enables the one or more processors 1004 to send via the external interface 1002 a request for location capabilities to a UE and to receive from the UE via the external interface 1002 a location capabilities response from the UE, where the location capabilities may indicate the UE's capability to send location information to the location server function 1000 at the L1 or L2 protocol level.

The memory 1010 may further include a cipher unit 1026 that enables the one or more processors 1004 to determine a cipher key, which may be sent to the UE, e.g., with the position measurement request so that the UE may cipher the location information using the cipher key and to send the cipher key to the UE via the external interface 1002.

The memory 1010 may further include a handover unit 1028 that enables the one or more processors 1004 to identify a change of serving cell or serving base station for the UE, e.g., when the UE is in a connected state, or to receive via the external interface 1002 an indication of a new serving cell or a new serving base station for the UE and an indication of connectivity, when the UE is in an inactive state. When the location server function 1000 is receiving a type of measurement from a plurality of neighboring base stations that is used to calculate the location of the UE, the handover unit 1028, may enable the one or more processors 1004 to determine whether there is sufficient or insufficient signaling connectivity at the new serving base station to allow the new serving base station to receive measurement from the plurality of base stations being used to determine the location estimate of the UE 105. The handover unit 1028, for example, may enable the one or more processors 1004 to cancel the type of measurement in the plurality of base stations when insufficient connectivity is determined or to refrain from cancelling if there is sufficient connectivity. The memory 1010 may further include a connectivity unit 1030 that enables the one or more processors 1004 to send an indication of the determination of sufficient or insufficient connectivity to the new serving base station, which enables the new serving base station to configure at least some of the plurality of base stations to send the type of measurement to the new serving base station when sufficient connectivity is indicated, and where the indication enables the new serving base station to refrain from configuring the plurality of base station when insufficient connectivity is indicated. The memory 1010 may further include a location context unit 1032 that enables the one or more processors 1004 to send a location context for the UE to the new serving base station, where the location context enables a continuation of location reporting for the UE by the new serving base station. The location context, for example, may be one or more of: (i) information for a location request initiated by an external client; (ii) an indication of a type of location information being received from the UE; (iii) an indication of UL location measurements for the UE being obtained by a serving base station; (iv) an indication of UL location measurements for the UE being obtained by other base stations and identities for the other base stations; (v) an indication of DL RSs being transmitted by other base stations and identities for the other base stations; (vi) an indication of UL signals being transmitted by the UE; (vii) a location session identifier; (viii) an indication of the use of the L1 or L2 protocol levels for sending the location information by the UE; (ix) location capabilities of the UE; or (x) some combination of these.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1010) and executed by one or more processor units (e.g. processors 1004), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1010, and are configured to cause the one or more processors (e.g. processors 1004) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server function located at a serving base station for a user equipment (UE) in a Radio Access Network (RAN) and configured for locating the UE may include a means for receiving a request for locating the UE, wherein the request for locating the UE is based on a location request initiated by an external client and is received using control plane signaling, which may be, e.g., the external interface 1002 and one or more processors 1004 with dedicated hardware or implementing executable code or software instructions in memory 1010 such as the location request receive unit 1012. A means for receiving location information from the UE at a layer 1 (L1) or layer 2 (L2) protocol level may be, e.g., the external interface 1002 and one or more processors 1004 with dedicated hardware or implementing executable code or software instructions in memory 1010 such as the location information obtain unit 1014. A means for calculating a location of the UE using the location information may be, e.g., the one or more processors 1004 with dedicated hardware or implementing executable code or software instructions in memory 1010 such as the location determination unit 1016. A means for sending a location report including the location of the UE to the external client using user plane signaling may be, e.g., the external interface 1002 and one or more processors 1004 with dedicated hardware or implementing executable code or software instructions in memory 1010 such as the location information report unit 1018.

In one implementation, the location server function may include means for receiving from the UE first measurements of downlink (DL) signals transmitted by one or more first base stations in a plurality of base stations in the RAN, wherein the one or more first base stations include the serving base station, which may be, e.g., the external interface 1002 and one or more processors 1004 with dedicated hardware or implementing executable code or software instructions in memory 1010 such as the location information obtain unit 1014. Means for receiving from each of the plurality of base stations second measurements of uplink (UL) signals transmitted by the UE may be, e.g., the external interface 1002 and one or more processors 1004 with dedicated hardware or implementing executable code or software instructions in memory 1010 such as the location information obtain unit 1014. Means for determining timing information for the plurality of base stations based, at least in part, on the first measurements and the second measurements may be, e.g., the one or more processors 1004 with dedicated hardware or implementing executable code or software instructions in memory 1010 such as the timing information unit 1020. Means for calculating the location of the UE using the location information and the timing information for the plurality of base stations may be, e.g., the one or more processors 1004 with dedicated hardware or implementing executable code or software instructions in memory 1010 such as the location determination unit 1016. In one implementation, the location server function may further include means for sending a request to the UE to send the first measurements, which may be, e.g., the external interface 1002 and one or more processors 1004 with dedicated hardware or implementing executable code or software instructions in memory 1010 such as the positioning request unit 1022. Means for sending a request to each of the plurality of base stations to send the second measurements may be, e.g., the external interface 1002 and one or more processors 1004 with dedicated hardware or implementing executable code or software instructions in memory 1010 such as the positioning request unit 1022. In one implementation, the location server function may further include means for receiving from a plurality of UEs third measurements of DL signals transmitted by one or more second base stations in the plurality of base stations, wherein the one or more second base stations include the serving base station, which may be, e.g., the external interface 1002 and one or more processors 1004 with dedicated hardware or implementing executable code or software instructions in memory 1010 such as the location information obtain unit 1014. Means for receiving from the plurality of base stations fourth measurements of UL signals transmitted by each of the plurality of UEs may be, e.g., the external interface 1002 and one or more processors 1004 with dedicated hardware or implementing executable code or software instructions in memory 1010 such as the location information obtain unit 1014. Means for determining the timing information for each of the plurality of base stations based, at least in part, on the third measurements and the fourth measurements may be, e.g., the one or more processors 1004 with dedicated hardware or implementing executable code or software instructions in memory 1010 such as the timing information unit 1020.

In one implementation, the location server function may include means for receiving location capabilities for the UE from the UE, wherein the location capabilities indicate a capability to send the location information at the L1 or L2 protocol level, which may be, e.g., the external interface 1002 and one or more processors 1004 with dedicated hardware or implementing executable code or software instructions in memory 1010 such as the location capabilities unit 1024. Means for sending a request to the UE to send the location information at the L1 or L2 protocol level may be, e.g., the external interface 1002 and one or more processors 1004 with dedicated hardware or implementing executable code or software instructions in memory 1010 such as the positioning request unit 1022.

In one implementation, the location information is ciphered and the location server function may include means for determining a ciphering key, which may be, e.g., the one or more processors 1004 with dedicated hardware or implementing executable code or software instructions in memory 1010 such as the cipher unit 1026. A means for sending the ciphering key to the UE, wherein the location information is ciphered by the UE based on the ciphering key may be, e.g., the external interface 1002 and one or more processors 1004 with dedicated hardware or implementing executable code or software instructions in memory 1010 such as the cipher unit 1026.

In one implementation, the location server function may include a means for identifying a change of SgNB for the UE, wherein the change of SgNB is to a new SgNB, which may be, e.g., the external interface 1002 and one or more processors 1004 with dedicated hardware or implementing executable code or software instructions in memory 1010 such as the handover unit 1028. A means for sending a location context for the UE to the new SgNB, wherein the location context enables a continuation of location reporting for the UE by the new SgNB may be, e.g., the external interface 1002 and one or more processors 1004 with dedicated hardware or implementing executable code or software instructions in memory 1010 such as the location context unit 1032. For example, in some implementations, the location server function may further include means for receiving a type of measurement from a plurality of neighboring NR Node Bs (NgNBs) in the RAN, wherein calculating the location of the UE, or calculating timing information for the plurality of NgNBs, is based in part on the type of measurement, which may be, e.g., the external interface 1002 and one or more processors 1004 with dedicated hardware or implementing executable code or software instructions in memory 1010 such as the location information obtain unit 1014. Means for determining whether there is sufficient or insufficient signaling connectivity at the new SgNB to allow the new SgNB to receive the type of measurement from the plurality of NgNBs may be, e.g., the one or more processors 1004 with dedicated hardware or implementing executable code or software instructions in memory 1010 such as the handover unit 1028. A means for cancelling the type of measurement in the plurality of NgNBs following the change of SgNB when insufficient connectivity is determined may be, e.g., the one or more processors 1004 with dedicated hardware or implementing executable code or software instructions in memory 1010 such as the handover unit 1028. A means for refraining from cancelling the type of measurement in the plurality of NgNBs following the change of SgNB when sufficient signaling connectivity is determined may be, e.g., the one or more processors 1004 with dedicated hardware or implementing executable code or software instructions in memory 1010 such as the handover unit 1028. A means for sending an indication of the determination of sufficient or insufficient signaling connectivity to the new SgNB, wherein the indication enables the new SgNB to configure at least some of the plurality of NgNBs to send the type of measurement to the new SgNB when sufficient signaling connectivity is indicated, wherein the indication enables the new SgNB to refrain from configuring the plurality of gNBs when insufficient signaling connectivity is indicated may be, e.g., the one or more processors 1004 with dedicated hardware or implementing executable code or software instructions in memory 1010 such as the connectivity unit 1030.

Figure 11:
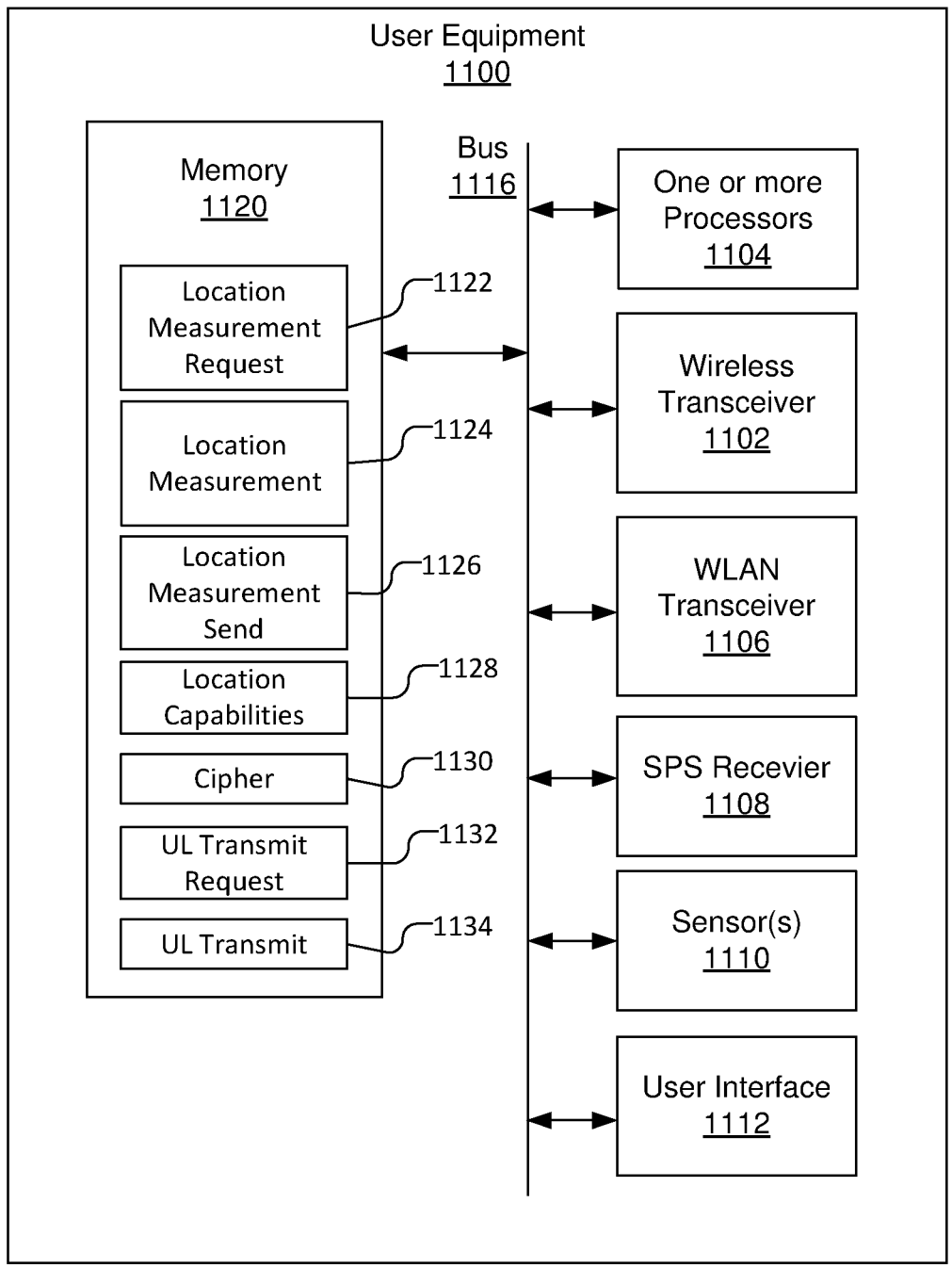
FIG. 11 is a block diagram of an embodiment of a user equipment that supports an SLLLS.

FIG. 11 is a diagram illustrating an example of a hardware implementation of a UE 1100, such as UE 105 shown in FIG. 1. The UE 1100 may include a wireless transceiver 1102 to wirelessly communicate with a base station in a Radio Access Network, such as a Serving gNB (SgNB) 110-1 or a location server function located with the SgNB 110-1, as discussed herein, and shown in FIGS. 1, 2, 4-7, and 9. The UE 1100 may also include additional transceivers, such a wireless local area network (WLAN) transceiver 1106, as well as an SPS receiver 1108 for receiving and measuring signals from SPS SVs 190 (shown in FIG. 1). The UE 1100 may further include one or more sensors 1110, such as cameras, accelerometers, gyroscopes, electronic compass, magnetometer, barometer, etc. The UE 1100 may further include a user interface 1112 that may include e.g., a display, a keypad or other input device, such as virtual keypad on the display, through which a user may interface with the UE 1100. The UE 1100 further includes one or more processors 1104 and memory 1120, which may be coupled together with bus 1116. The one or more processors 1104 and other components of the UE 1100 may similarly be coupled together with bus 1116, a separate bus, or may be directly connected together or coupled using a combination of the foregoing. The memory 1120 may store data and may contain executable code or software instructions that when executed by the one or more processors 1104 cause the one or more processors to operate as a special purpose computer programmed to perform the algorithms disclosed herein.

As illustrated in FIG. 11, the memory 1120 may include one or more components or modules that may be implemented by the one or more processors 1104 to perform the methodologies described herein. While the components or modules are illustrated as software in memory 1120 that is executable by the one or more processors 1104, it should be understood that the components or modules may be dedicated hardware or firmware either in the one or more processors 1104 or off the processors. As illustrated, the memory 1120 may include a location measurement request unit 1122 that configures the one or more processors 1104 to receive location measurement requests via wireless transceiver 1102 from a serving base station, such as SgNB 110-1. The location measurement request unit 1122, for example, may configure the one or more processors 1104 to receive a first request for first location measurements and a second request for second location measurements, which may be location measurements of DL signals, e.g., one or both of Positioning Reference Signals and Tracking Reference Signals, received from a plurality of base stations, e.g., SgNB 110-1 and NgNBs 110-2, 110-3, 110-4. The first request, for example, may be for RSTD measurements, and the second request may be for Rx-Tx measurements. The first request and second request may be received in one or more messages using an RRC protocol.

A location measurement unit 1124 configures the one or more processors 1104 to perform the requested location measurements, which may be, e.g., RSTD and/or Rx-Tx measurements. Other types of measurements may be performed if desired, such as time of arrival (TOA), round trip signal propagation time (RTT), angle of arrival (AOA), angle of departure (AOD), received signal strength indication (RSSI), reference signal received power (RSRP), reference signal received quality (RSRQ), Global Navigation Satellite System (GNSS) code phase, GNSS carrier phase, WiFi AP RTT, WiFi AP RSSI, sensor measurements, or some combination of these.

A location measurement send unit 1126 configures the one or more processors 1104 to send, e.g., via the wireless transceiver 1102, first location measurements to the serving base station at a layer 1 (L1) or layer 2 (L2) protocol level at first periodic intervals, and to send the second location measurements to the serving base station at second periodic intervals, where the first periodic intervals are shorter than the second periodic intervals. The L1 or L2 protocol levels may be, e.g., one or more of a Physical layer, a MAC layer, an RLC layer and a Packet Data Convergence Protocol (PDCP) layer. The second location measurements may be sent, e.g., at the L1 or L2 protocol levels or at a RRC protocol level.

The memory 1120 may further include a location capabilities unit 1128 that enables the one or more processors 1104 to receive via the wireless transceiver 1102, a request for location capabilities from the serving base station and to send via wireless transceiver 1102 a location capabilities response to the serving base station, where the location capabilities may indicate the UE's capability to send location information to the location server function 1000 at the L1 or L2 protocol level.

The memory 1120 may further include a cipher unit 1130 that enables the one or more processors 1104 to receive via the wireless transceiver 1102, a cipher key from the serving base station, which may be in the first request for first location measurements, and to cipher the first location measurements using the cipher key prior to sending the first location measurements to the serving base station at the L1 or L2 protocol level.

The memory 1120 may further include an UL transmit request unit 1132 that enables the one or more processors 1104 to receive via the wireless transceiver 1102, a request from the serving base station to transmit UL signals. The request to transmit UL signals may be received in a message using an RRC protocol. The request to transmit UL signals may be received in the same message as the first request and second request for location measurements. A UL transmit unit 1134 enables the one or more processors 1104 to transmit via the wireless transceiver 1102, UL signals, e.g., Positioning Reference Signals, Sounding Reference Signals, or both, at third periodic intervals, where the first periodic intervals are shorter than the third periodic intervals, and where the UL signals enable location measurements of the UE by a plurality of base stations, including the serving base station.

The methodologies described herein may be implemented by various means depending upon the application. For example, these methodologies may be implemented in hardware, firmware, software, or any combination thereof. For a hardware implementation, the one or more processors 1104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1120) and executed by one or more processors 1104, causing the one or more processors 1104 to operate as a special purpose computer programmed to perform the techniques disclosed herein. Memory may be implemented within the one or processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1100 may be stored as one or more instructions or code on a non-transitory computer-readable storage medium such as memory 1120. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1100 may be provided as signals on transmission media included in a communication apparatus. For example, a communication apparatus comprising part or all of UE 1100 may include a transceiver having signals indicative of instructions and data. The instructions and data are stored on non-transitory computer readable media, e.g., memory 1120, and are configured to cause the one or more processors 1104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE capable of supporting locating the UE may include a means for receiving a first request for first location measurements and a second request for second location measurements from a serving base station in a Radio Access Network (RAN), which may be, e.g., the wireless transceiver 1102 and one or more processors 1104 with dedicated hardware or implementing executable code or software instructions in memory 1010 such as the location measurement request unit 1122. A means for sending the first location measurements to the serving base station at a layer 1 (L1) or layer 2 (L2) protocol level at first periodic intervals may be, e.g., the wireless transceiver 1102 and one or more processors 1104 with dedicated hardware or implementing executable code or software instructions in memory 1010 such as the location measurement send unit 1126. A means for sending the second location measurements to the serving base station at second periodic intervals, wherein the first periodic intervals are shorter than the second periodic intervals may be, e.g., the wireless transceiver 1102 and one or more processors 1104 with dedicated hardware or implementing executable code or software instructions in memory 1010 such as the location measurement send unit 1126.

In one implementation, the UE may include a means for receiving a request for location capabilities of the UE from the serving base station, which may be, e.g., the wireless transceiver 1102 and one or more processors 1104 with dedicated hardware or implementing executable code or software instructions in memory 1010 such as the location capabilities unit 1128. A means for sending the location capabilities of the UE to the serving base station, wherein the location capabilities indicate a capability to send the first location measurements at the L1 or L2 protocol level may be, e.g., the wireless transceiver 1102 and one or more processors 1104 with dedicated hardware or implementing executable code or software instructions in memory 1010 such as the location capabilities unit 1128.

In one implementation, the UE may include means for receiving a third request from the serving base station to transmit uplink (UL) signals, which may be, e.g., the wireless transceiver 1102 and one or more processors 1104 with dedicated hardware or implementing executable code or software instructions in memory 1010 such as the UL transmit request unit 1132. Means for transmitting the uplink (UL) signals at third periodic intervals, wherein the first periodic intervals are shorter than the third periodic intervals, wherein the UL signals enable location measurements of the UE by a plurality of base stations in the RAN, wherein the plurality of base stations includes the serving base station may be, e.g., the wireless transceiver 1102 and one or more processors 1104 with dedicated hardware or implementing executable code or software instructions in memory 1010 such as the UL transmit unit 1134.

One implementation may be described as follows:

1. A method for locating a user equipment (UE) performed by a location server function located at a serving base station for the UE in a Radio Access Network (RAN), the method comprising:

receiving a request for locating the UE, wherein the request for locating the UE is based on a location request initiated by an external client and is received using control plane signaling;

receiving location information from the UE at a layer 1 (L1) or layer 2 (L2) protocol level;

calculating a location of the UE using the location information; and sending a location report including the location of the UE to the external client using user plane signalling.

2. The method of claim 1, wherein the user plane signaling is based on at least one of Internet Protocol (IP), Transmission Control Protocol (TCP), Transport Layer Security (TLS), or some combination of these.

3. The method of claim 1, wherein the location report is sent to the external client using user plane signaling by sending a message for the Hypertext Transfer Protocol (HTTP) or the Secure User Plane Location (SUPL) User-Plane Location Protocol (ULP).

4. The method of claim 3, wherein message for the HTTP comprises an HTTP POST message and the message for the SUPL ULP comprises a SUPL POS message, SUPL POS INIT message or SUPL REPORT message.

5. The method of claim 1, wherein the L1 or L2 protocol level comprises one of:
(i) a Physical layer;
(ii) a Media Access Control (MAC) layer;
(iii) a Radio Link Control (RLC) layer; or
(iv) a Packet Data Convergence Protocol (PDCP) layer; or
(v) some combination of these.

6. The method of claim 1, wherein the location information received from the UE comprises Reference Signal Time Difference (RSTD) measurements, sensor measurements or both RSTD and sensor measurements.

7. The method of claim 4, wherein calculating the location of the UE using the location information uses Observed Time Difference of Arrival (OTDOA).

8. The method of claim 1, further comprising:

receiving from the UE first measurements of downlink (DL) signals transmitted by one or more first base stations in a plurality of base stations in the RAN, wherein the one or more first base stations include the serving base station;

receiving from each of the plurality of base stations second measurements of uplink (UL) signals transmitted by the UE;

determining timing information for the plurality of base stations based, at least in part, on the first measurements and the second measurements; and calculating the location of the UE using the location information and the timing information for the plurality of base stations.

9. The method of claim 6, wherein the first measurements comprise Receive Time-Transmission Time (Rx-Tx) measurements or Reference Signal Time Difference (RSTD) measurements or both, wherein the second measurements comprise Time of Arrival (TOA) measurements or Rx-Tx measurements or both, wherein the timing information for the plurality of base stations comprises Real Time Differences (RTDs) between pairs of base stations in the plurality of base stations.

10. The method of claim 6, wherein the DL signals comprise Positioning Reference Signals, Tracking Reference Signals, or both.

11. The method of claim 6, wherein the UL signals comprise Positioning Reference Signals, Sounding Reference Signals, or both.

12. The method of claim 6, further comprising:

sending a request to the UE to send the first measurements; and sending a request to each of the plurality of base stations to send the second measurements.

13. The method of claim 6, wherein the location information is received from the UE and the location report is sent to the external client at first periodic intervals, wherein the first measurements are received from the UE at second periodic intervals, wherein the second measurements are received from each base station in the plurality of base stations at third periodic intervals, wherein the first periodic intervals are shorter than the second periodic intervals and the third periodic intervals.

14. The method of claim 6, further comprising:

receiving from a plurality of UEs third measurements of DL signals transmitted by one or more second base stations in the plurality of base stations, wherein the one or more second base stations include the serving base station;

receiving from the plurality of base stations fourth measurements of UL signals transmitted by each of the plurality of UEs; and determining the timing information for each of the plurality of base stations based, at least in part, on the third measurements and the fourth measurements.

15. The method of claim 12, wherein the third measurements comprise Receive Time-Transmission Time (Rx-Tx) measurements or Reference Signal Time Difference (RSTD) measurements or both, wherein the fourth measurements comprise Time of Arrival (TOA) measurements or Rx-Tx measurements or both, wherein the timing information for each of the plurality of base stations comprises Real Time Differences (RTDs) between pairs of base stations in the plurality of base stations.

16. The method of claim 1, further comprising:

receiving location capabilities for the UE from the UE, wherein the location capabilities indicate a capability to send the location information at the L1 or L2 protocol level; and sending a request to the UE to send the location information at the L1 or L2 protocol level.

17. The method of claim 1, wherein the location information is ciphered, and further comprising:

determining a ciphering key; and sending the ciphering key to the UE, wherein the location information is ciphered by the UE based on the ciphering key.

18. The method of claim 1, wherein the location server function is located at the serving base station.

19. The method of claim 1 wherein the RAN is a next generation Radio Access Network (NG-RAN) providing 5G New Radio (NR) wireless access to the UE and the serving base station is a Serving NR Node B (SgNB) for the UE.

20. The method of claim 17, wherein the request for locating the UE is received from an Access and Mobility Management Function (AMF) or a previous SgNB for the UE.

21. The method of claim 17, further comprising:

identifying a change of SgNB for the UE, wherein the change of SgNB is to a new SgNB; and sending a location context for the UE to the new SgNB, wherein the location context enables a continuation of location reporting for the UE by the new SgNB.

22. The method of claim 19, wherein the identifying the change of SgNB for the UE is based on determining a handover for the UE to a serving cell for the new SgNB when the UE is in a connected state or on receiving a request for a UE context from the new SgNB when the UE is in an inactive state.

23. The method of claim 19, wherein the location context comprises one of:

(i) information for the location request initiated by the external client;

(ii) an indication of a type of location information being received from the UE;

(iii) an indication of uplink (UL) location measurements for the UE being obtained by the SgNB;

(iv) an indication of UL location measurements for the UE being obtained by other NR Node Bs (gNBs) or Reception Points (RPs) and identities for the other gNBs or RPs;

(v) an indication of DL reference signals (RSs) being transmitted by other gNBs or transmission points (TPs) and identities for the other gNBs or TPs;

(vi) an indication of UL signals being transmitted by the UE;

(vii) a location session identifier;

(viii) an indication of the use of the L1 or L2 protocol levels for sending the location information by the UE;

(ix) location capabilities of the UE; or (x) some combination of the above.

24. The method of claim 19, further comprising:

receiving a type of measurement from a plurality of neighboring NR Node Bs (NgNBs) in the RAN, wherein calculating the location of the UE, or calculating timing information for the plurality of NgNBs, is based in part on the type of measurement;

determining whether there is sufficient or insufficient signaling connectivity at the new SgNB to allow the new SgNB to receive the type of measurement from the plurality of NgNBs;

cancelling the type of measurement in the plurality of NgNBs following the change of SgNB when insufficient connectivity is determined;

refraining from cancelling the type of measurement in the plurality of NgNBs following the change of SgNB when sufficient signaling connectivity is determined; and sending an indication of the determination of sufficient or insufficient signaling connectivity to the new SgNB, wherein the indication enables the new SgNB to configure at least some of the plurality of NgNBs to send the type of measurement to the new SgNB when sufficient signaling connectivity is indicated, wherein the indication enables the new SgNB to refrain from configuring the plurality of gNBs when insufficient signaling connectivity is indicated.

25. A location server function located at a serving base station for a user equipment (UE) in a Radio Access Network (RAN) and capable of locating the UE, the location server function comprising:

an external interface configured to communicate with one or more base stations in the RAN, one or more network nodes, and one or more UEs;

at least one memory;

at least one processor coupled to the external interface and the at least one memory, wherein the at least one processor is configured to:

receive, via the external interface, a request for locating the UE, wherein the request for locating the UE is based on a location request initiated by an external client and is received using control plane signaling;

receive, via the external interface, location information from the UE at a layer 1 (L1) or layer 2 (L2) protocol level;

calculate a location of the UE using the location information; and send, via the external interface, a location report including the location of the UE to the external client using user plane signalling.

26. The location server function of claim 23, wherein the user plane signaling is based on at least one of Internet Protocol (IP), Transmission Control Protocol (TCP), Transport Layer Security (TLS), or some combination of these.

27. The location server function of claim 23, wherein the location report is sent to the external client using user plane signaling by sending a message for the Hypertext Transfer Protocol (HTTP) or the Secure User Plane Location (SUPL) UserPlane Location Protocol (ULP).

28. The location server function of claim 27, wherein message for the HTTP comprises an HTTP POST message and the message for the SUPL ULP comprises a SUPL POS message, SUPL POS INIT message or SUPL REPORT message.

29. The location server function of claim 23, wherein the L1 or L2 protocol level comprises one of:

(i) a Physical layer;

(ii) a Media Access Control (MAC) layer;

(iii) a Radio Link Control (RLC) layer;

(iv) a Packet Data Convergence Protocol (PDCP) layer; or (v) a combination thereof.

30. The location server function of claim 23, wherein the location information received from the UE comprises Reference Signal Time Difference (RSTD) measurements, sensor measurements or both RSTD and sensor measurements.

31. The location server function of claim 26, wherein the at least one processor is configured to calculate the location of the UE using the location information using Observed Time Difference of Arrival (OTDOA).

32. The location server function of claim 23, wherein the at least one processor is further configured to:

receive from the UE, via the external interface, first measurements of downlink (DL) signals transmitted by one or more first base stations in a plurality of base stations in the RAN, wherein the one or more first base stations include the serving base station;

receive from each of the plurality of base stations, via the external interface, second measurements of uplink (UL) signals transmitted by the UE;

determine timing information for the plurality of base stations based, at least in part, on the first measurements and the second measurements; and calculate the location of the UE using the location information and the timing information for the plurality of base stations.

33. The location server function of claim 28, wherein the first measurements comprise Receive Time-Transmission Time (Rx-Tx) measurements or Reference Signal Time Difference (RSTD) measurements or both, wherein the second measurements comprise Time of Arrival (TOA) measurements or Rx-Tx measurements or both, wherein the timing information for the plurality of base stations comprises Real Time Differences (RTDs) between pairs of base stations in the plurality of base stations.

34. The location server function of claim 28, wherein the DL signals comprise Positioning Reference Signals, Tracking Reference Signals, or both.

35. The location server function of claim 28, wherein the UL signals comprise Positioning Reference Signals, Sounding Reference Signals, or both.

36. The location server function of claim 28, wherein the at least one processor is further configured to:
send, via the external interface, a request to the UE to send the first measurements; and
send, via the external interface, a request to each of the plurality of base stations to send the second measurements.

37. The location server function of claim 28, wherein the location information is received from the UE and the location report is sent to the external client at first periodic intervals, wherein the first measurements are received from the UE at second periodic intervals, wherein the second measurements are received from each base station in the plurality of base stations at third periodic intervals, wherein the first periodic intervals are shorter than the second periodic intervals and the third periodic intervals.

38. The location server function of claim 28, wherein the at least one processor is further configured to:
receive from a plurality of UEs, via the external interface, third measurements of DL signals transmitted by one or more second base stations in the plurality of base stations, wherein the one or more second base stations include the serving base station;
receive from the plurality of base stations, via the external interface, fourth measurements of UL signals transmitted by each of the plurality of UEs; and
determine the timing information for each of the plurality of base stations based, at least in part, on the third measurements and the fourth measurements.

39. The location server function of claim 34, wherein the third measurements comprise Receive Time-Transmission Time (Rx-Tx) measurements or Reference Signal Time Difference (RSTD) measurements or both, wherein the fourth measurements comprise Time of Arrival (TOA) measurements or Rx-Tx measurements or both, wherein the timing information for each of the plurality of base stations comprises Real Time Differences (RTDs) between pairs of base stations in the plurality of base stations.

40. The location server function of claim 23, wherein the at least one processor is further configured to:
receive, via the external interface, location capabilities for the UE from the UE, wherein the location capabilities indicate a capability to send the location information at the L1 or L2 protocol level; and
send, via the external interface, a request to the UE to send the location information at the L1 or L2 protocol level.

41. The location server function of claim 23, wherein the location information is ciphered, and the at least one processor is further configured to:
determine a ciphering key; and
send, via the external interface, the ciphering key to the UE, wherein the location information is ciphered by the UE based on the ciphering key.

42. The location server function of claim 23, wherein the location server function is location at the serving base station.

43. The location server function of claim 23, wherein the RAN is a next generation Radio Access Network (NG-RAN) providing 5G New Radio (NR) wireless access to the UE and the serving base station is a Serving NR Node B (SgNB) for the UE.

44. The location server function of claim 39, wherein the request for locating the UE is received from an Access and Mobility Management Function (AMF) or a previous SgNB for the UE.

45. The location server function of claim 39, wherein the at least one processor is further configured to:
identify a change of SgNB for the UE, wherein the change of SgNB is to a new SgNB; and
send, via the external interface, a location context for the UE to the new SgNB, wherein the location context enables a continuation of location reporting for the UE by the new SgNB.

46. The location server function of claim 41, wherein the at least one processor is configured to identify the change of SgNB for the UE by being configured to determine a handover for the UE to a serving cell for the new SgNB when the UE is in a connected state or receive a request for a UE context from the new SgNB when the UE is in an inactive state.

47. The location server function of claim 41, wherein the location context comprises one of:
(i) information for the location request initiated by the external client;
(ii) an indication of a type of location information being received from the UE;
(iii) an indication of uplink (UL) location measurements for the UE being obtained by the SgNB;
(iv) an indication of UL location measurements for the UE being obtained by other NR Node Bs (gNBs) or Reception Points (RPs) and identities for the other gNBs or RPs;
(v) an indication of DL reference signals (RSs) being transmitted by other gNBs or transmission points (TPs) and identities for the other gNBs or TPs;
(vi) an indication of UL signals being transmitted by the UE;
(vii) a location session identifier;
(viii) an indication of the use of the L1 or L2 protocol levels for sending the location information by the UE;
(ix) location capabilities of the UE; or
(x) some combination of the above.

48. The location server function of claim 41, wherein the at least one processor is further configured to:
receive, via the external interface, a type of measurement from a plurality of neighboring NR Node Bs (NgNBs) in the RAN, wherein calculating the location of the UE, or calculating timing information for the plurality of NgNBs, is based in part on the type of measurement;
determine whether there is sufficient or insufficient signaling connectivity at the new SgNB to allow the new SgNB to receive the type of measurement from the plurality of NgNBs;
cancel the type of measurement in the plurality of NgNBs following the change of SgNB when insufficient connectivity is determined;
refrain from cancelling the type of measurement in the plurality of NgNBs following the change of SgNB when sufficient signaling connectivity is determined; and
send, via the external interface, an indication of the determination of sufficient or insufficient signaling connectivity to the new SgNB, wherein the indication enables the new SgNB to configure at least some of the plurality of NgNBs to send the type of measurement to the new SgNB when sufficient signaling connectivity is indicated, wherein the indication enables the new SgNB to refrain from configuring the plurality of gNBs when insufficient signaling connectivity is indicated.

49. A location server function located at a serving base station for a user equipment (UE) in a Radio Access Network (RAN) and configured for locating the UE, the location server function comprising:
 means for receiving a request for locating the UE, wherein the request for locating the UE is based on a location request initiated by an external client and is received using control plane signaling;
 means for receiving location information from the UE at a layer 1 (L1) or layer 2 (L2) protocol level;
 means for calculating a location of the UE using the location information; and
 means for sending a location report including the location of the UE to the external client using user plane signalling.

50. A non-transitory computer readable medium including program code stored thereon, the program code is operable to configure at least one processor in a location server function located at a serving base station for a user equipment (UE) in a Radio Access Network (RAN) and configured for locating the UE, comprising:
 program code to receive a request for locating the UE, wherein the request for locating the UE is based on a location request initiated by an external client and is received using control plane signaling;
 program code to receive location information from the UE at a layer 1 (L1) or layer 2 (L2) protocol level;
 program code to calculate a location of the UE using the location information; and
 program code to send a location report including the location of the UE to the external client using user plane signalling.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:
1. A method for locating a user equipment (UE) performed by a location server function located at a serving base station for the UE in a Radio Access Network (RAN), the method comprising:
 receiving a request for locating the UE, wherein the request for locating the UE is based on a location request initiated by an external client and is received using control plane signaling;

receiving location information from the UE, the location information included in a layer 1 (L1) or layer 2 (L2) protocol level positioning measurement report message, wherein the location information comprises measurements performed by the UE, including:
  measurements of one or more wireless reference signals, or
  sensor measurements, or
  both;
calculating a location of the UE using the location information; and
sending a location report including the location of the UE to the external client using user plane signalling.

2. The method of claim 1, wherein the user plane signaling is based on at least one of Internet Protocol (IP), Transmission Control Protocol (TCP), Transport Layer Security (TLS), or some combination of these.

3. The method of claim 1, wherein the location report is sent to the external client using user plane signaling by sending a message for the Hypertext Transfer Protocol (HTTP) or the Secure User Plane Location (SUPL) User-Plane Location Protocol (ULP).

4. The method of claim 3, wherein message for the HTTP comprises an HTTP POST message and the message for the SUPL ULP comprises a SUPL POS message, SUPL POS INIT message or SUPL REPORT message.

5. The method of claim 1, wherein the L1 or L2 protocol level comprises one of:
  (i) a Physical layer;
  (ii) a Media Access Control (MAC) layer;
  (iii) a Radio Link Control (RLC) layer; or
  (iv) a Packet Data Convergence Protocol (PDCP) layer; or
  (v) some combination of these.

6. The method of claim 1, wherein the measurements comprise Reference Signal Time Difference (RSTD) measurements, sensor measurements or both RSTD and sensor measurements.

7. The method of claim 6, wherein calculating the location of the UE using the location information uses Observed Time Difference of Arrival (OTDOA).

8. The method of claim 1, wherein the measurements comprise first measurements of downlink (DL) signals transmitted by one or more first base stations in a plurality of base stations in the RAN, and wherein the one or more first base stations include the serving base station; wherein the method further comprises:
  receiving from each of the plurality of base stations second measurements of uplink (UL) signals transmitted by the UE;
  determining timing information for the plurality of base stations based, at least in part, on the first measurements and the second measurements; and
  calculating the location of the UE using the location information and the timing information for the plurality of base stations.

9. The method of claim 8, wherein the first measurements comprise Receive Time-Transmission Time (Rx-Tx) measurements or Reference Signal Time Difference (RSTD) measurements or both, wherein the second measurements comprise Time of Arrival (TOA) measurements or Rx-Tx measurements or both, wherein the timing information for the plurality of base stations comprises Real Time Differences (RTDs) between pairs of base stations in the plurality of base stations.

10. The method of claim 8, wherein the DL signals comprise Positioning Reference Signals, Tracking Reference Signals, or both.

11. The method of claim 8, wherein the UL signals comprise Positioning Reference Signals, Sounding Reference Signals, or both.

12. The method of claim 8, further comprising:
  sending a request to the UE to send the first measurements; and
  sending a request to each of the plurality of base stations to send the second measurements.

13. The method of claim 8, wherein the location information is received from the UE and the location report is sent to the external client at first periodic intervals, wherein the first measurements are received from the UE at second periodic intervals, wherein the second measurements are received from each base station in the plurality of base stations at third periodic intervals, wherein the first periodic intervals are shorter than the second periodic intervals and the third periodic intervals.

14. The method of claim 8, further comprising:
  receiving from a plurality of UEs third measurements of DL signals transmitted by one or more second base stations in the plurality of base stations, wherein the one or more second base stations include the serving base station;
  receiving from the plurality of base stations fourth measurements of UL signals transmitted by each of the plurality of UEs; and
  determining the timing information for each of the plurality of base stations based, at least in part, on the third measurements and the fourth measurements.

15. The method of claim 14, wherein the third measurements comprise Receive Time-Transmission Time (Rx-Tx) measurements or Reference Signal Time Difference (RSTD) measurements or both, wherein the fourth measurements comprise Time of Arrival (TOA) measurements or Rx-Tx measurements or both, wherein the timing information for each of the plurality of base stations comprises Real Time Differences (RTDs) between pairs of base stations in the plurality of base stations.

16. The method of claim 1, further comprising:
  receiving location capabilities for the UE from the UE, wherein the location capabilities indicate a capability to send the location information via the L1 or L2 protocol level; and
  sending a request to the UE to send the location information via the L1 or L2 protocol level.

17. The method of claim 1, wherein the location information is ciphered, and further comprising:
  determining a ciphering key; and
  sending the ciphering key to the UE, wherein the location information is ciphered by the UE based on the ciphering key.

18. The method of claim 1, wherein the location server function is located at the serving base station.

19. The method of claim 1 wherein the RAN is a next generation Radio Access Network (NG-RAN) providing 5G New Radio (NR) wireless access to the UE and the serving base station is a Serving NR Node B (SgNB) for the UE.

20. The method of claim 19, wherein the request for locating the UE is received from an Access and Mobility Management Function (AMF) or a previous SgNB for the UE.

21. The method of claim 19, further comprising:
  identifying a change of SgNB for the UE, wherein the change of SgNB is to a new SgNB; and
  sending a location context for the UE to the new SgNB, wherein the location context enables a continuation of location reporting for the UE by the new SgNB.

22. The method of claim 21, wherein the identifying the change of SgNB for the UE is based on determining a handover for the UE to a serving cell for the new SgNB when the UE is in a connected state or on receiving a request for a UE context from the new SgNB when the UE is in an inactive state.

23. The method of claim 21, wherein the location context comprises one of:
   (i) information for the location request initiated by the external client;
   (ii) an indication of a type of location information being received from the UE;
   (iii) an indication of uplink (UL) location measurements for the UE being obtained by the SgNB;
   (iv) an indication of UL location measurements for the UE being obtained by other NR Node Bs (gNBs) or Reception Points (RPs) and identities for the other gNBs or RPs;
   (v) an indication of DL reference signals (RSs) being transmitted by other gNBs or transmission points (TPs) and identities for the other gNBs or TPs;
   (vi) an indication of UL signals being transmitted by the UE;
   (vii) a location session identifier;
   (viii) an indication of the use of the L1 or L2 protocol levels for sending the location information by the UE;
   (ix) location capabilities of the UE; or
   (x) some combination of the above.

24. The method of claim 21, further comprising:
   receiving a type of measurement from a plurality of neighboring NR Node Bs (NgNBs) in the RAN, wherein calculating the location of the UE, or calculating timing information for the plurality of NgNBs, is based in part on the type of measurement;
   determining whether there is sufficient or insufficient signaling connectivity at the new SgNB to allow the new SgNB to receive the type of measurement from the plurality of NgNBs;
   cancelling the type of measurement in the plurality of NgNBs following the change of SgNB when insufficient connectivity is determined;
   refraining from cancelling the type of measurement in the plurality of NgNBs following the change of SgNB when sufficient signaling connectivity is determined; and
   sending an indication of the determination of sufficient or insufficient signaling connectivity to the new SgNB, wherein the indication enables the new SgNB to configure at least some of the plurality of NgNBs to send the type of measurement to the new SgNB when sufficient signaling connectivity is indicated, wherein the indication enables the new SgNB to refrain from configuring the plurality of NgNBs when insufficient signaling connectivity is indicated.

25. A location server function located at a serving base station for a user equipment (UE) in a Radio Access Network (RAN) and capable of locating the UE, the location server function comprising:
   an external interface configured to communicate with one or more base stations in the RAN, one or more network nodes, and one or more UEs;
   at least one memory;
   at least one processor coupled to the external interface and the at least one memory, wherein the at least one processor is configured to:
      receive, via the external interface, a request for locating the UE, wherein the request for locating the UE is based on a location request initiated by an external client and is received using control plane signaling;
      receive, via the external interface, location information from the UE, the location information included in a layer 1 (L1) or layer 2 (L2) protocol level positioning measurement report message, wherein the location information comprises measurements performed by the UE, including:
         measurements of one or more wireless reference signals, or
         sensor measurements, or
         both;
      calculate a location of the UE using the location information; and
      send, via the external interface, a location report including the location of the UE to the external client using user plane signalling.

26. The location server function of claim 25, wherein the user plane signaling is based on at least one of Internet Protocol (IP), Transmission Control Protocol (TCP), Transport Layer Security (TLS), or some combination of these.

27. The location server function of claim 25, wherein the location report is sent to the external client using user plane signaling by sending a message for the Hypertext Transfer Protocol (HTTP) or the Secure User Plane Location (SUPL) UserPlane Location Protocol (ULP).

28. The location server function of claim 27, wherein message for the HTTP comprises an HTTP POST message and the message for the SUPL ULP comprises a SUPL POS message, SUPL POS INIT message or SUPL REPORT message.

29. The location server function of claim 25, wherein the L1 or L2 protocol level comprises one of:
   (i) a Physical layer;
   (ii) a Media Access Control (MAC) layer;
   (iii) a Radio Link Control (RLC) layer;
   (iv) a Packet Data Convergence Protocol (PDCP) layer; or
   (v) a combination thereof.

30. The location server function of claim 25, wherein the measurements comprise Reference Signal Time Difference (RSTD) measurements, sensor measurements or both RSTD and sensor measurements.

31. The location server function of claim 30, wherein the at least one processor is configured to calculate the location of the UE using the location information using Observed Time Difference of Arrival (OTDOA).

32. The location server function of claim 25, wherein to receive the location information comprising the measurements, the at least one processor is further configured to receive from the UE, via the external interface, first measurements of downlink (DL) signals transmitted by one or more first base stations in a plurality of base stations in the RAN, wherein the one or more first base stations include the serving base station;
   wherein the one or more processors are further configured to:
      receive from each of the plurality of base stations, via the external interface, second measurements of uplink (UL) signals transmitted by the UE;
      determine timing information for the plurality of base stations based, at least in part, on the first measurements and the second measurements; and
      calculate the location of the UE using the location information and the timing information for the plurality of base stations.

33. The location server function of claim 32, wherein the first measurements comprise Receive Time-Transmission Time (Rx-Tx) measurements or Reference Signal Time Difference (RSTD) measurements or both, wherein the second measurements comprise Time of Arrival (TOA) measurements or Rx-Tx measurements or both, wherein the timing information for the plurality of base stations comprises Real Time Differences (RTDs) between pairs of base stations in the plurality of base stations.

34. The location server function of claim 32, wherein the DL signals comprise Positioning Reference Signals, Tracking Reference Signals, or both.

35. The location server function of claim 32, wherein the UL signals comprise Positioning Reference Signals, Sounding Reference Signals, or both.

36. The location server function of claim 32, wherein the at least one processor is further configured to:
   send, via the external interface, a request to the UE to send the first measurements; and
   send, via the external interface, a request to each of the plurality of base stations to send the second measurements.

37. The location server function of claim 32, wherein the location information is received from the UE and the location report is sent to the external client at first periodic intervals, wherein the first measurements are received from the UE at second periodic intervals, wherein the second measurements are received from each base station in the plurality of base stations at third periodic intervals, wherein the first periodic intervals are shorter than the second periodic intervals and the third periodic intervals.

38. The location server function of claim 32, wherein the at least one processor is further configured to:
   receive from a plurality of UEs, via the external interface, third measurements of DL signals transmitted by one or more second base stations in the plurality of base stations, wherein the one or more second base stations include the serving base station;
   receive from the plurality of base stations, via the external interface, fourth measurements of UL signals transmitted by each of the plurality of UEs; and
   determine the timing information for each of the plurality of base stations based, at least in part, on the third measurements and the fourth measurements.

39. The location server function of claim 38, wherein the third measurements comprise Receive Time-Transmission Time (Rx-Tx) measurements or Reference Signal Time Difference (RSTD) measurements or both, wherein the fourth measurements comprise Time of Arrival (TOA) measurements or Rx-Tx measurements or both, wherein the timing information for each of the plurality of base stations comprises Real Time Differences (RTDs) between pairs of base stations in the plurality of base stations.

40. The location server function of claim 25, wherein the at least one processor is further configured to:
   receive, via the external interface, location capabilities for the UE from the UE, wherein the location capabilities indicate a capability to send the location information via the L1 or L2 protocol level; and
   send, via the external interface, a request to the UE to send the location information via the L1 or L2 protocol level.

41. The location server function of claim 25, wherein the location information is ciphered, and the at least one processor is further configured to:
   determine a ciphering key; and
   send, via the external interface, the ciphering key to the UE, wherein the location information is ciphered by the UE based on the ciphering key.

42. The location server function of claim 25, wherein the location server function is location at the serving base station.

43. The location server function of claim 25, wherein the RAN is a next generation Radio Access Network (NG-RAN) providing 5G New Radio (NR) wireless access to the UE and the serving base station is a Serving NR Node B (SgNB) for the UE.

44. The location server function of claim 43, wherein the request for locating the UE is received from an Access and Mobility Management Function (AMF) or a previous SgNB for the UE.

45. The location server function of claim 43, wherein the at least one processor is further configured to:
   identify a change of SgNB for the UE, wherein the change of SgNB is to a new SgNB; and
   send, via the external interface, a location context for the UE to the new SgNB, wherein the location context enables a continuation of location reporting for the UE by the new SgNB.

46. The location server function of claim 45, wherein the at least one processor is configured to identify the change of SgNB for the UE by being configured to determine a handover for the UE to a serving cell for the new SgNB when the UE is in a connected state or receive a request for a UE context from the new SgNB when the UE is in an inactive state.

47. The location server function of claim 45, wherein the location context comprises one of:
   (i) information for the location request initiated by the external client;
   (ii) an indication of a type of location information being received from the UE;
   (iii) an indication of uplink (UL) location measurements for the UE being obtained by the SgNB;
   (iv) an indication of UL location measurements for the UE being obtained by other NR Node Bs (gNBs) or Reception Points (RPs) and identities for the other gNBs or RPs;
   (v) an indication of DL reference signals (RSs) being transmitted by other gNBs or transmission points (TPs) and identities for the other gNBs or TPs;
   (vi) an indication of UL signals being transmitted by the UE,
   (vii) a location session identifier;
   (viii) an indication of the use of the L1 or L2 protocol levels for sending the location information by the UE;
   (ix) location capabilities of the UE; or
   (x) some combination of the above.

48. The location server function of claim 45, wherein the at least one processor is further configured to:
   receive, via the external interface, a type of measurement from a plurality of neighboring NR Node Bs (NgNBs) in the RAN, wherein calculating the location of the UE, or calculating timing information for the plurality of NgNBs, is based in part on the type of measurement;
   determine whether there is sufficient or insufficient signaling connectivity at the new SgNB to allow the new SgNB to receive the type of measurement from the plurality of NgNBs;
   cancel the type of measurement in the plurality of NgNBs following the change of SgNB when insufficient connectivity is determined;
   refrain from cancelling the type of measurement in the plurality of NgNBs following the change of SgNB when sufficient signaling connectivity is determined; and send, via the external interface, an indication of the determination of sufficient or insufficient signaling connectivity to the new SgNB, wherein the indication enables the new SgNB to configure at least some of the plurality of NgNBs to send the type of measurement to the new SgNB when sufficient signaling connectivity is indicated, wherein the indication enables the new SgNB to refrain from configuring the plurality of NgNBs when insufficient signaling connectivity is indicated.

49. A location server function located at a serving base station for a user equipment (UE) in a Radio Access Network (RAN) and configured for locating the UE, the location server function comprising:
  means for receiving a request for locating the UE, wherein the request for locating the UE is based on a location request initiated by an external client and is received using control plane signaling;
  means for receiving location information from the UE, the location information included in a layer 1 (L1) or layer 2 (L2) protocol level positioning measurement report message, wherein the location information comprises measurements performed by the UE, including:
    measurements of one or more wireless reference signals, or
    sensor measurements, or
    both;
  means for calculating a location of the UE using the location information; and
  means for sending a location report including the location of the UE to the external client using user plane signalling.

50. A non-transitory computer readable medium including program code stored thereon, the program code is operable to configure at least one processor in a location server function located at a serving base station for a user equipment (UE) in a Radio Access Network (RAN) and configured for locating the UE, comprising:
  program code to receive a request for locating the UE, wherein the request for locating the UE is based on a location request initiated by an external client and is received using control plane signaling;
  program code to receive location information from the UE, the location information included in a layer 1 (L1) or layer 2 (L2) protocol level positioning measurement report message, wherein the location information comprises measurements performed by the UE, including:
    measurements of one or more wireless reference signals, or
    sensor measurements, or
    both;
  program code to calculate a location of the UE using the location information; and
  program code to send a location report including the location of the UE to the external client using user plane signalling.

* * * * *